US011513315B2

(12) United States Patent
Inomata et al.

(10) Patent No.: US 11,513,315 B2
(45) Date of Patent: Nov. 29, 2022

(54) FOCUS CONTROL DEVICE, FOCUS CONTROL METHOD, PROGRAM, AND IMAGING DEVICE

(71) Applicant: Sony Group Corporation, Tokyo (JP)

(72) Inventors: Seiichi Inomata, Tokyo (JP); Takahiro Kosugi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/339,891

(22) PCT Filed: Oct. 10, 2017

(86) PCT No.: PCT/JP2017/036612
§ 371 (c)(1),
(2) Date: Apr. 5, 2019

(87) PCT Pub. No.: WO2018/096810
PCT Pub. Date: May 31, 2018

(65) Prior Publication Data
US 2019/0265436 A1 Aug. 29, 2019

(30) Foreign Application Priority Data

Nov. 25, 2016 (JP) .............................. JP2016-228935

(51) Int. Cl.
H04N 5/232 (2006.01)
G02B 7/34 (2021.01)
(Continued)

(52) U.S. Cl.
CPC .............. G02B 7/34 (2013.01); G02B 7/282 (2013.01); G02B 7/36 (2013.01); G03B 13/36 (2013.01);
(Continued)

(58) Field of Classification Search
None
See application file for complete search history.

(56) References Cited

U.S. PATENT DOCUMENTS

2009/0002543 A1* 1/2009 Tomita ................. H04N 5/2251
348/345
2009/0262230 A1* 10/2009 Sugiura ................ G06F 3/0488
348/333.11
(Continued)

FOREIGN PATENT DOCUMENTS

CN 1847904 A 10/2006
CN 102236147 A 11/2011
(Continued)

OTHER PUBLICATIONS

Chinese Office Action dated Jan. 29, 2021 for corresponding Chinese Application No. 201780071125.5.

Primary Examiner — Twyler L Haskins
Assistant Examiner — Wesley J Chiu
(74) Attorney, Agent, or Firm — Michael Best & Friedrich LLP

(57) ABSTRACT

A focus driving control unit 34 of a control unit 30 performs speed priority driving control in which a focus lens is driven to a focusing position in a driving pattern selected in advance by a user, for example, in a case in which a defocus amount of a ranging area is greater than a driving control determination threshold set in advance. In addition, the focus driving control unit 34 performs subject priority driving control in which a focus lens movement amount by which the focus lens is located at the focusing position in accordance with the defocus amount of the ranging area is set and the focus lens is driven in a case in which the defocus amount is equal to or less than the driving control determination threshold. The focus lens is driven to the focusing position in the driving pattern selected by the user. There- (Continued)

after, a focusing state can be maintained. Accordingly, it is possible to easily perform an auto-focus operation with the high degree of freedom.

8 Claims, 17 Drawing Sheets

(51) Int. Cl.
  *G02B 7/28* (2021.01)
  *G02B 7/36* (2021.01)
  *G03B 13/36* (2021.01)

(52) U.S. Cl.
  CPC ......... *H04N 5/232* (2013.01); *H04N 5/23212* (2013.01)

(56) References Cited

U.S. PATENT DOCUMENTS

| | | | | |
|---|---|---|---|---|
| 2011/0267706 | A1* | 11/2011 | Karasawa | G02B 7/282 359/698 |
| 2015/0358530 | A1* | 12/2015 | Nakamura | H04N 5/23293 348/349 |
| 2016/0255267 | A1* | 9/2016 | Takamiya | G02B 7/34 348/349 |
| 2016/0295102 | A1* | 10/2016 | Kanda | H04N 5/23212 |
| 2017/0228887 | A1* | 8/2017 | Sekimoto | H04N 5/23212 |
| 2017/0366739 | A1* | 12/2017 | Iwasaki | H04N 5/232123 |
| 2018/0048805 | A1* | 2/2018 | Kawanishi | H04N 5/23212 |
| 2019/0268545 | A1* | 8/2019 | Inomata | H04N 5/232123 |

FOREIGN PATENT DOCUMENTS

| | | |
|---|---|---|
| JP | 2005249831 A | 9/2005 |
| JP | 2006171145 A | 6/2006 |
| JP | 2006-301032 A | 11/2006 |
| JP | 2006301034 A | 11/2006 |
| JP | 2008026790 A | 2/2008 |
| JP | 2008058482 A | 3/2008 |
| JP | 2014056032 A | 3/2014 |
| JP | 2017040726 A | 2/2017 |

* cited by examiner

FIG. 7
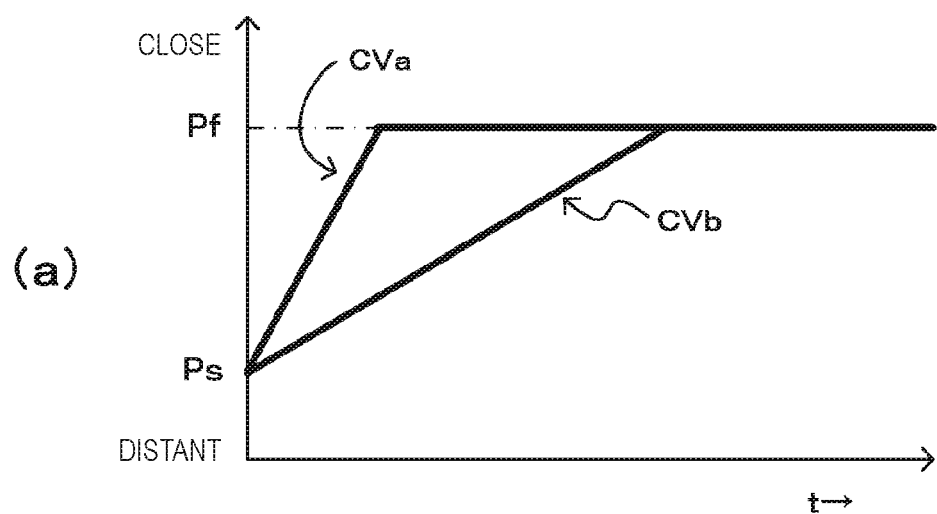
(a)
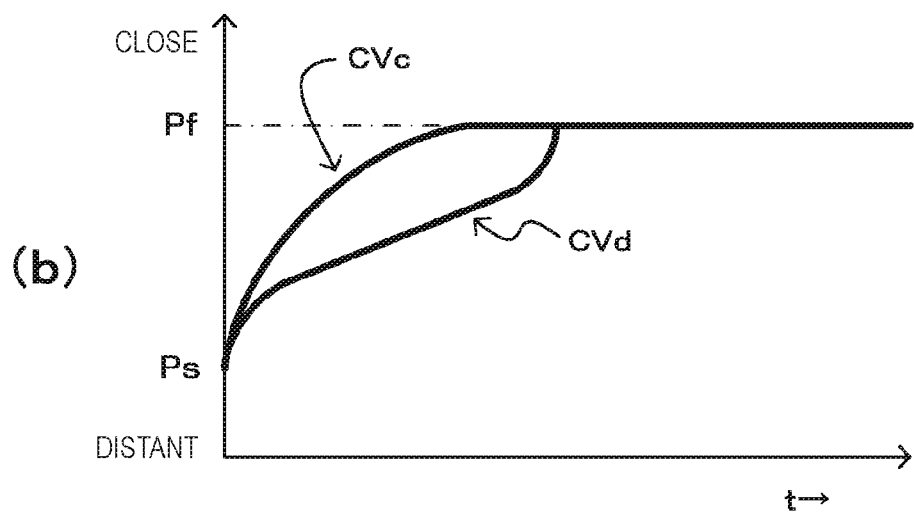
(b)

FIG. 8
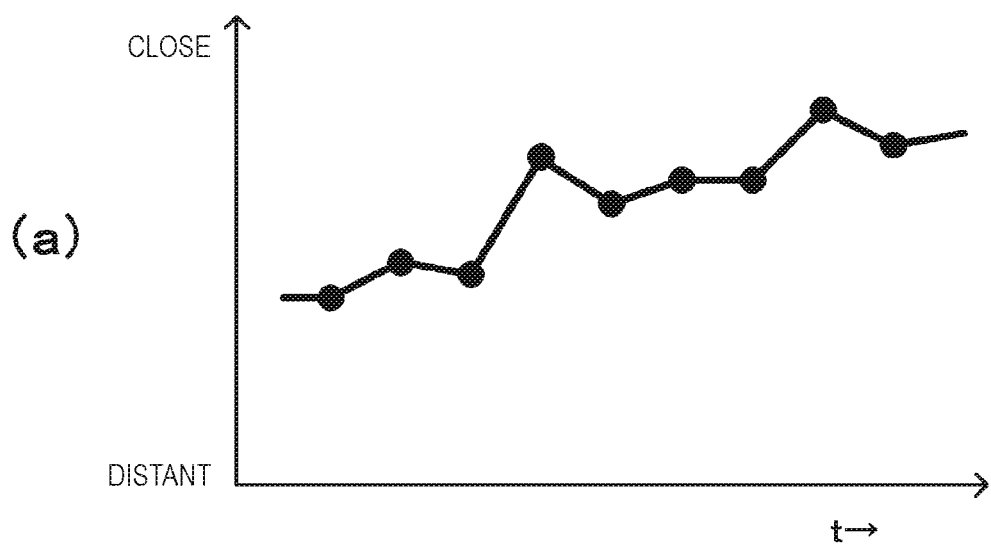
(a)
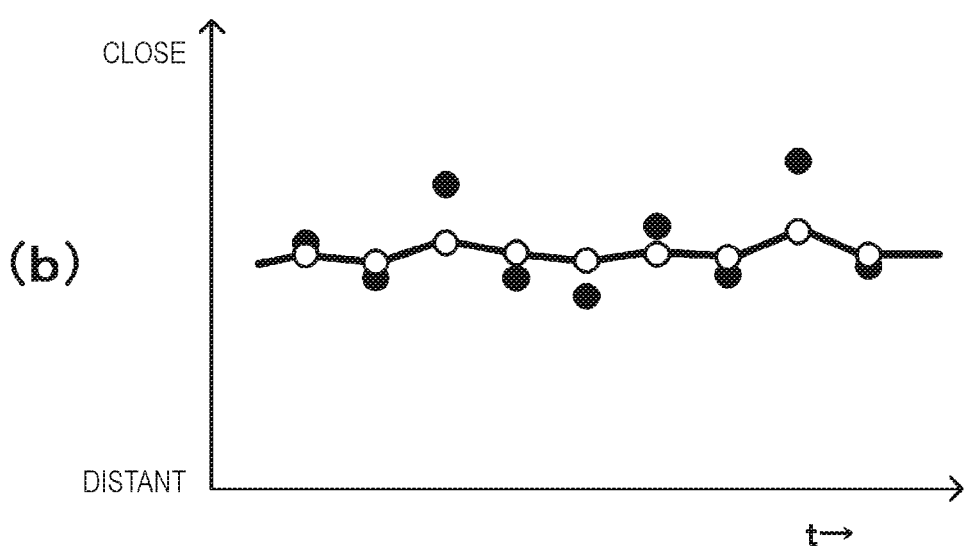
(b)

FIG. 10
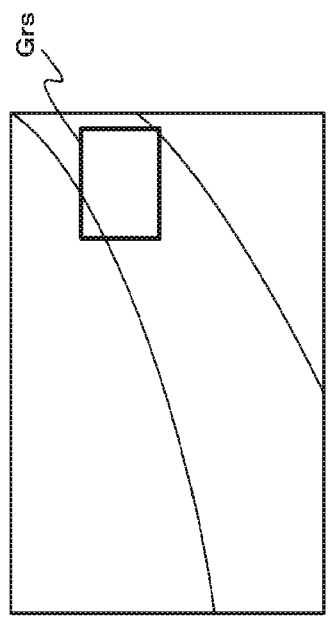
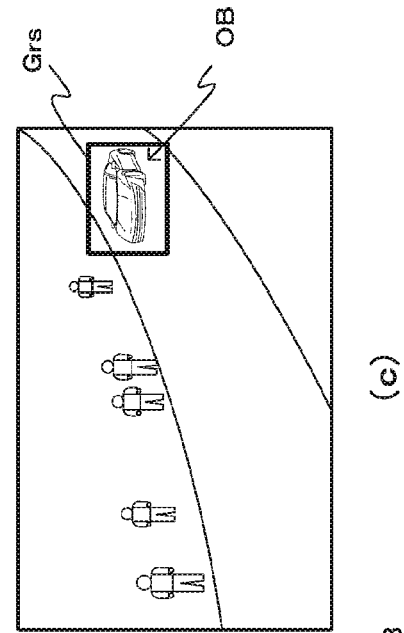
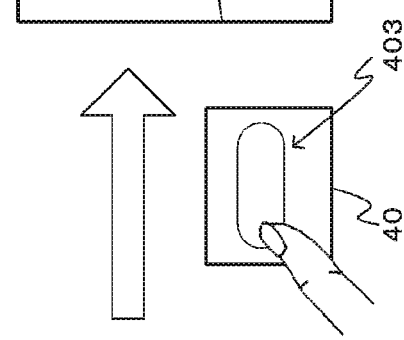
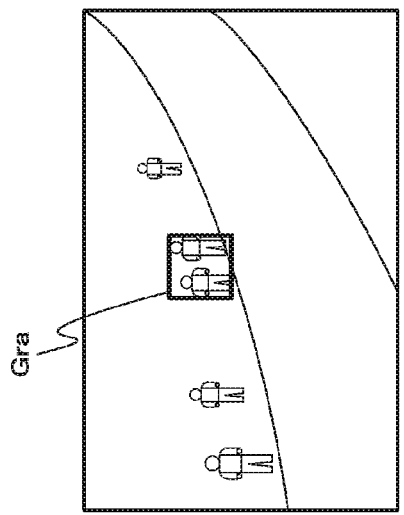

FIG. 15
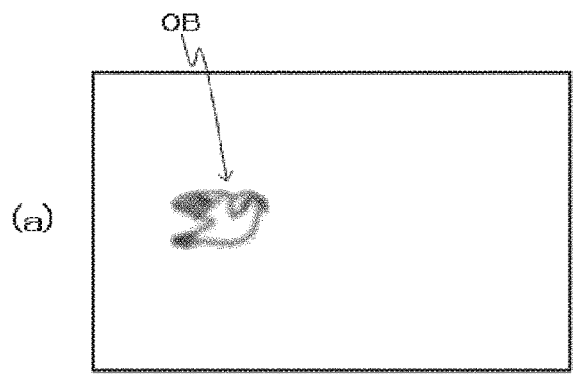
(a)
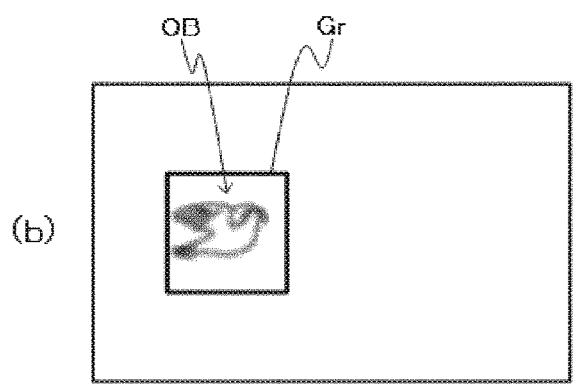
(b)
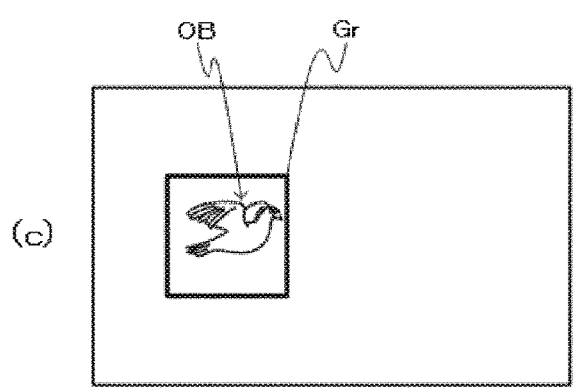
(c)
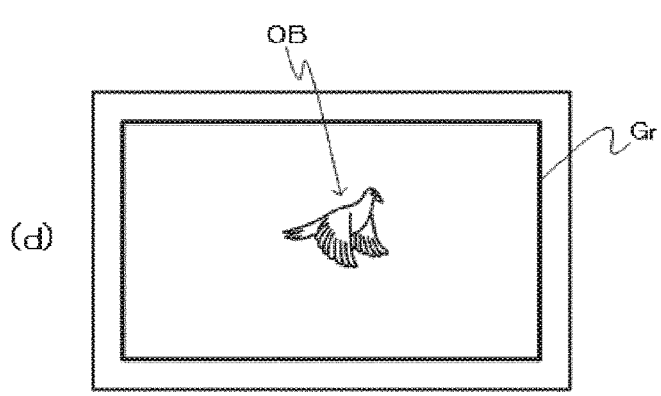
(d)

FOCUS CONTROL DEVICE, FOCUS CONTROL METHOD, PROGRAM, AND IMAGING DEVICE

TECHNICAL FIELD

The present technology relates to a focus control device, a focus control method, a program, and an imaging device and enables an auto-focus operation with the high degree of freedom to be easily performed.

BACKGROUND ART

In the related art, auto-focus operations have been performed on the basis of ranging results in focus control devices. For example, in Patent Literature 1, setting a movement direction and a movement speed of a focus lens on the basis of a ranging result is performed.

CITATION LIST

Patent Literature

Patent Literature 1: JP 2006-301032A

DISCLOSURE OF INVENTION

Technical Problem

Incidentally, even when the movement direction and the movement speed of the focus lens are set on the basis of the ranging result, for example, characteristics such as a focus change or focus precision in an auto-focus operation are not characteristics that a user desires in some cases.

Accordingly, an object of the present technology is to provide a focus control device, a focus control method, a program, and an imaging device capable of easily performing an auto-focus operation with a high degree of freedom.

Solution to Problem

A first aspect of the present technology is a focus control device including: a focus driving control unit configured to perform speed priority driving control in which a focus lens is driven to a focusing position in a driving pattern set in advance in a case in which a defocus amount detected in a ranging area within an imaging screen is greater than a driving control determination threshold set in advance.

In the present technology, in a case in which an evaluation value in accordance with sharpness of a subject image calculated by extracting a high frequency component from the defocus amount or the image signal detected in the ranging area within the imaging screen is less than a driving control determination threshold, the focus driving control unit performs the speed priority driving control, sets a movement speed of the focus lens in accordance with a driving pattern set in advance, for example, the driving pattern set or changed in accordance with a user manipulation, and drives the focus lens to the focusing position. In addition, a driving pattern storage unit configured to store a driving pattern is further included. The focus driving control unit generates a driving pattern in accordance with a user manipulation on the focus lens and stores the driving pattern in the driving pattern storage unit.

A second aspect of the present technology is a focus control device including: a focus driving control unit configured to perform subject priority driving control in which a focus lens movement amount by which a focus lens is located at a focusing position in accordance with a defocus amount detected in a ranging area within an imaging screen is set and the focus lens is driven in a case in which the defocus amount is equal to or less than a driving control determination threshold set in advance.

In the present technology, the focus driving control unit performs the subject priority driving control in a case in which the defocus amount detected in the ranging area within the imaging screen is equal to or less than the driving control determination threshold set in advance. In the subject priority driving control, the focus lens movement amount by which the focus lens is located at the focusing position in accordance with the defocus amount is set and the focus lens is driven. For example, trackability priority control in which the focus lens movement amount is set so that the defocus amount is minimized, stability priority control in which the focus lens movement amount is set so that a smoothed defocus amount obtained by smoothing the defocus amount in a time direction or a spatial direction is minimized, or precision priority control in which an evaluation value in accordance with sharpness of an image is calculated from a captured image of a subject of the ranging area and the focus lens is driven so that the sharpness is maximized is performed. Moreover, a user interface unit configured to receive a user manipulation is included, and the focus driving control unit performs setting or changing the ranging area in accordance with the user manipulation.

A third aspect of the present technology is a focus control device including: a focus driving control unit configured to perform driving control of a focus lens in accordance with a defocus amount detected in a ranging area within an imaging screen and setting a region size of the ranging area, in which the focus driving control unit performs speed priority driving control in which the focus lens is driven to a focusing position in a driving pattern set in advance in a case in which the defocus amount is greater than a driving control determination threshold set in advance, performs subject priority driving control in which a focus lens movement amount by which the focus lens is located at the focusing position in accordance with the defocus amount is set and the focus lens is driven in a case in which the defocus amount is equal to or less than the driving control determination threshold, sets the ranging area to a ranging size at a time of speed priority driving which is a region size set in advance in a case in which the defocus amount is greater than a ranging area determination threshold set in advance, and sets the ranging area to a subject priority ranging size which is a region size different from the ranging size at the time of the speed priority driving in a case in which the defocus amount is equal to or less than the ranging area determination threshold.

In the present technology, in a case in which the defocus amount detected in the ranging area within the imaging screen is greater than the ranging area determination threshold set in advance, the focus driving control unit sets the ranging area to the ranging size at the time of the speed priority driving which is the region size set in advance. In a case in which the defocus amount is equal to or less than the ranging area determination threshold, the ranging area is set to the subject priority ranging size which is the region size different from the ranging size at the time of the speed priority driving. In addition, the focus driving control unit sets the subject priority ranging size in accordance with a motion state of a subject of the ranging area. For example, in a case in which the subject of the ranging area is a moving subject, the subject priority ranging size is set to be larger than the ranging size at the time of the speed priority driving. In a case in which the subject is a stationary subject, the subject priority ranging size is set to the ranging size at the time of the speed priority driving or to be less than the ranging size at the time of the speed priority driving. In addition, the focus driving control unit performs setting of the subject priority ranging size in accordance with, for example, an imaging mode of the subject. In a case in which the imaging mode is a mode in which a moving subject is imaged, the subject priority ranging size is set to be larger than the ranging size at the time of the speed priority driving. In a case in which the imaging mode is a mode in which a stationary subject is imaged, the subject priority ranging size is set to the ranging size at the time of the speed priority driving or to be less than the ranging size at the time of the speed priority driving. In addition, the focus driving control unit sets the subject priority ranging size in accordance with a depth of field and sets a region size to be smaller in a case in which the depth of field is deep than in a case in which the depth of field is shallow.

A fourth aspect of the present technology is a focus control method including: performing, by a focus driving control unit, speed priority driving control in which a focus lens is driven to a focusing position in a driving pattern set in advance in a case in which a defocus amount detected in a ranging area within an imaging screen is greater than a driving control determination threshold set in advance.

A fifth aspect of the present technology is a focus control method including: performing, by a focus driving control unit, subject priority driving control in which a focus lens movement amount by which the focus lens is located at a focusing position in accordance with a defocus amount detected in a ranging area within an imaging screen is set and the focus lens is driven in a case in which the defocus amount is equal to or less than a driving control determination threshold set in advance.

A sixth aspect of the present technology is a program causing a computer that performs focus control to perform: a procedure for driving a focus lens to a focusing position in a driving pattern set in advance in a case in which a defocus amount detected in a ranging area within an imaging screen is greater than a threshold set in advance; and a procedure for setting a focus lens movement amount by which the focus lens is located at a focusing position in accordance with the defocus amount and driving the focus lens in a case in which the defocus amount is equal to or less than the threshold.

Note that the program of the present technology is, for example, a program that can be provided by a storage medium or a communication medium that is provided in a computer-readable format to general-purpose computers capable of executing various programs and codes, such as a storage medium such as an optical disk, a magnetic disk, or a semiconductor memory, or a communication medium such as a network. By providing such a program in a computer-readable format, processing in accordance with the program is performed on a computer.

A seventh aspect of the present technology is an imaging device including: a defocus detection unit configured to detect a defocus amount of a ranging area within an imaging screen; an imaging optical system including a focus lens; and a focus driving control unit configured to perform speed priority driving control in which the focus lens is driven to a focusing position in a driving pattern set in advance in a case in which a defocus amount detected in the defocus detection unit is greater than a threshold set in advance and subject priority driving control in which a focus lens movement amount by which the focus lens is located at a focusing position in accordance with the defocus amount is set and the focus lens is driven in a case in which the defocus amount is equal to or less than the threshold.

Advantageous Effects of Invention

According to the present technology, in a case in which a defocus amount detected in a ranging area within an imaging screen is greater than a driving control determination threshold set in advance, speed priority driving control for driving the focus lens to a focusing position is performed in a driving pattern set in advance. Therefore, it is possible to easily perform an auto-focus operation with a high degree of freedom. Note that the effects described in the present specification are only examples and are not limitative ones, and there may be further an additional effect.

BRIEF DESCRIPTION OF DRAWINGS

FIG. 7 is a diagram exemplifying driving patterns which can be selected through speed priority driving control.

FIG. 8 is an explanatory diagram illustrating subject priority driving control.

FIG. 10 is an explanatory diagram illustrating an operation of changing a subject.

FIG. 15 is a diagram illustrating an operation example according to the second embodiment.

MODE(S) FOR CARRYING OUT THE INVENTION

Hereinafter, modes for carrying the present technology will be described. Note that the description will be made in the following order.

1. Configuration of imaging system
2. First embodiment of auto-focus control
3. Second embodiment of auto-focus control
4. Third embodiment of auto-focus control
5. Other embodiments of auto-focus control <1. Configuration of Imaging System>

Figure 1:
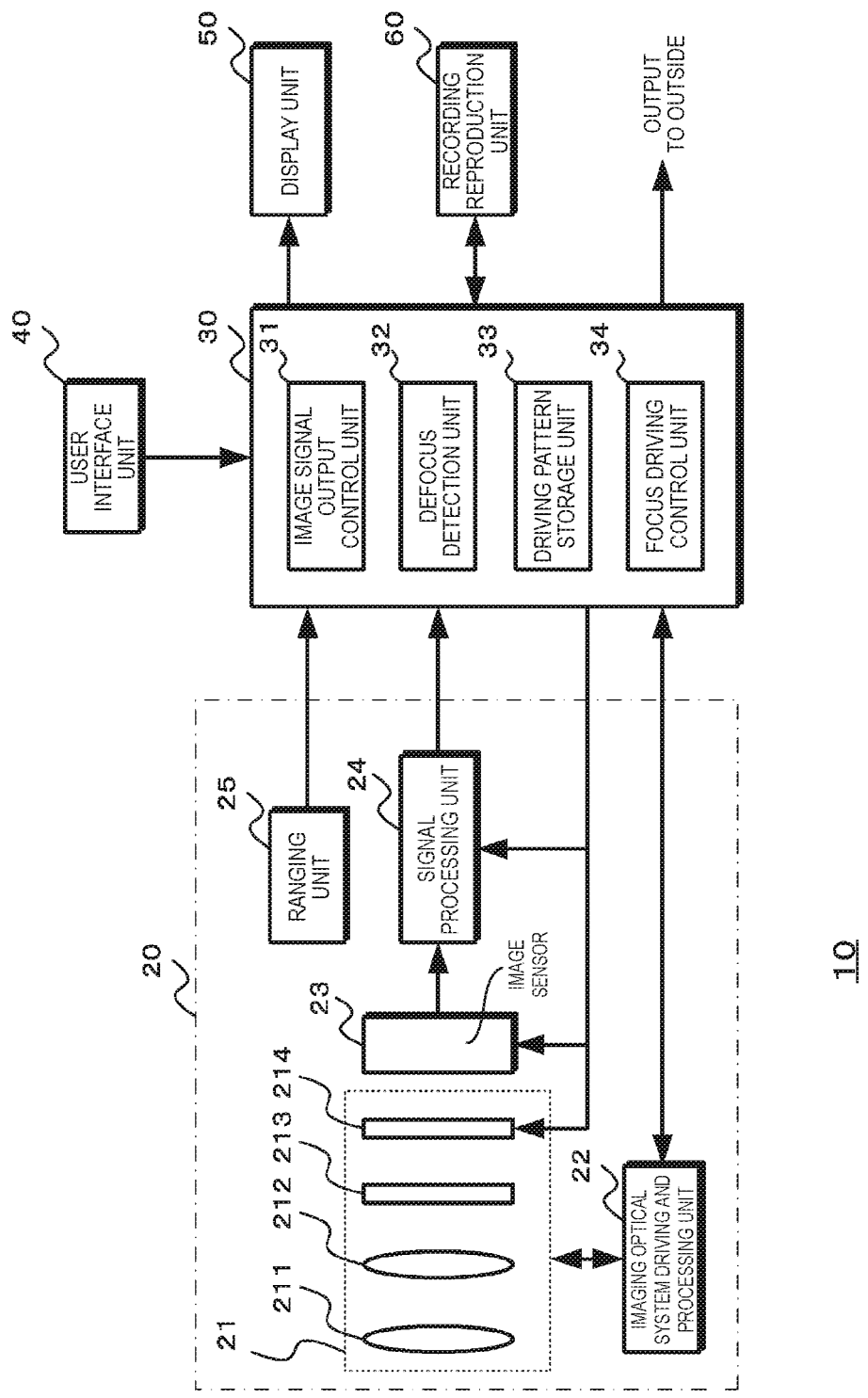
FIG. 1 is a diagram exemplifying a configuration of an imaging system.

FIG. 1 is a diagram exemplifying a configuration of an imaging system in which a focus control device is used according to the present technology. An imaging system 10 includes an imaging unit 20, a control unit 30, a user interface (I/F) unit 40, a display unit 50, and a recording reproduction unit 60. The imaging unit 20 generates an image signal of a captured image and ranging information indicating a ranging result of a subject included in the captured image and outputs the image signal and the ranging information to the control unit 30. In addition, the imaging unit 20 generates imaging optical system information indicating a control state of a lens or a diaphragm and outputs the imaging optical system information to the control unit 30. The control unit 30 performs operation control of the imaging unit 20 on the basis of a manipulation signal or ranging information from the user interface unit 40, the imaging optical system information, and the like. In addition, output control of the image signal generated by the imaging unit 20 is performed. The display unit 50 displays the captured image on the basis of the image signal output from the control unit 30. The recording reproduction unit 60 records the image signal output from the control unit 30 on a recording medium. Note that the imaging unit 20, the control unit 30, the display unit 50, and the recording reproduction unit 60 may be installed in an integrated manner or may be installed individually independently. In addition, only some of these units, for example, the control unit 30, the user interface unit 40, and the display unit 50, may be configured in an integrated manner.

The imaging unit 20 includes an imaging optical system block 21, an imaging optical system driving and processing unit 22, an image sensor 23, a signal processing unit 24, and a ranging unit 25.

The imaging optical system block 21 includes a focus lens 211, a zoom lens 212, a diaphragm 213, and a shutter mechanism 214. The focus lens 211 forms a subject optical image on an imaging surface of the image sensor 23. The zoom lens 212 adjusts the size of a subject optical image formed on the imaging surface of the image sensor 23. The diaphragm 213 adjusts brightness of the subject optical image formed on the imaging surface of the image sensor 23. The shutter mechanism 214 adjusts a period in which the subject optical image is formed on the imaging surface of the image sensor 23, that is, adjusts an exposure time of the image sensor 23.

The imaging optical system driving and processing unit 22 drives the focus lens 211 on the basis of a focus driving control signal from the control unit 30. In addition, the imaging optical system driving and processing unit 22 generates focus lens position information of the focus lens 211 and outputs the focus lens position information to the control unit 30. Further, the imaging optical system driving and processing unit 22 performs a process of driving the zoom lens 212 and the diaphragm on the basis of a zoom control signal or a diaphragm control signal from the control unit 30, and generates zoom lens position information or diaphragm setting information indicating a setting position of a lens position or a diaphragm of the zoom lens 212 and outputs the zoom lens position information of the diaphragm setting information to the control unit 30. In addition, the imaging optical system driving and processing unit 22 drives the shutter mechanism in correspondence with a designated exposure period on the basis of a shutter control signal from the control unit 30.

The image sensor 23 is configured as a complementary metal oxide semiconductor (CMOS) image sensor, a charge coupled device (CCD) image sensor, or the like and photo-electrically converts subject light incident on the imaging surface via the imaging optical system block 21 to generate an image signal. The image sensor 23 outputs the generated image signal to the signal processing unit 24.

The signal processing unit 24 performs a noise removing process, analog/digital (A/D) conversion, and the like on the image signal supplied from the image sensor 23. Further, the signal processing unit 24 performs demosaic processing, gamma correction, and an adjustment process for white balance, tone, saturation, contrast, or the like and outputs the processed image signal to the control unit 30.

The ranging unit 25 generates ranging information of a subject. The ranging unit 25 may be provided in the image sensor 23 or may be provided separately from the image sensor 23. For example, an image sensor in which image-surface phase difference detection pixels are provided on the imaging surface is used as the image sensor 23 in which the ranging unit 25 is provided. In focus control, phase difference detection pixels are provided in a ranging area which is a subject region on which focus is adjusted. The image-surface phase difference detection pixels individually generate image signals of one image and the other image split through pupil splitting. The ranging unit 25 detects a phase difference between the one image and the other image using image signals generated by the image-surface phase difference detection pixels.

In addition, in the ranging unit 25, a pair of line sensors for auto-focus may be provided separately from the image sensor to form one image and the other image split through the pupil splitting on the pair of line sensors and detect a phase difference between the images formed on the pair of line sensors. Further, as the ranging unit 25, a sensor or the like capable of measuring a distance to the subject on the basis of output light or reflection of radio waves may be used.

The ranging unit 25 outputs the ranging information indicating a distance to a subject or the detected phase difference to the control unit 30. In addition, the ranging unit 25 may generate a depth map indicating a depth of field for each pixel of a captured image and output the depth map as ranging information to the control unit 30.

The control unit 30 includes, for example, an image signal output control unit 31, a defocus detection unit 32, a driving pattern storage unit 33, a focus driving control unit 34, and the like. The image signal output control unit 31 performs control in which an image signal generated by the imaging unit 20 is output to the display unit 50, the recording reproduction unit 60, an external device, and the like on the basis of a manipulation signal from the user interface unit 40.

The defocus detection unit 32 detects a defocus amount indicating an error of focus on the basis of the ranging information. For example, in a case in which the ranging information indicates a phase difference, the phase difference may be used as a defocus amount or a difference in a focus lens position corresponding to the phase difference may be used as a defocus amount. In addition, in a case in which the ranging information indicates a distance to a subject, a difference between a current focus lens position and a focus lens position at which the subject at a distance indicated by the ranging information is in focus is used as a defocus amount. In addition, in a case in which the ranging information is a depth map, a difference between a current focus lens position and a focus lens position focused on a position indicated with a depth value in a ranging area is used as a defocus amount. The defocus detection unit 32 outputs the defocus amount detected from the ranging information to the focus driving control unit 34.

The driving pattern storage unit 33 stores a driving pattern when the focus lens is driven in accordance with the defocus amount detected by the defocus detection unit 32. The driving pattern may be, for example, a driving pattern indicating a movement speed of the focus lens or a driving pattern indicating a speed change or may be information for generating a driving pattern, for example, setting information in which a speed and a change pattern (a constant speed change, or a curved change, or the like) are designated, or the like. In addition, the driving pattern storage unit 33 may store a plurality of driving patterns so that a driving pattern can be selectively used by a user or the like.

The focus driving control unit 34 generates a focus driving control signal on the basis of the defocus amount of the ranging area or the manipulation signal from the user interface unit 40, and the driving pattern acquired from the driving pattern storage unit 33. The focus driving control unit 34 outputs the generated focus driving control signal to the imaging unit 20 and performs an auto-focus operation. In addition, the focus driving control unit 34 may generate a driving pattern according to a user manipulation on the focus lens 211 of the imaging optical system block 21 and store the generated driving pattern in the driving pattern storage unit. As the defocus amount of the ranging area, for example, in a case in which defocus amounts are obtained at a plurality of positions within the ranging area, for example, a median defocus amount of the area may be used or an average value of the plurality of defocus amounts included in the ranging area may be used as a defocus amount of the ranging area. Note that, in FIG. 1, the defocus detection unit 32 is provided separately from the focus driving control unit 34. However, a defocus amount of the ranging area may be calculated by the focus driving control unit 34 on the basis of ranging information or the like acquired from the ranging unit 25.

The user interface unit 40 includes a manipulation switch, a touch panel, or the like and outputs a manipulation signal in accordance with a user manipulation to the control unit 30.

The display unit 50 is configured using a liquid crystal display element, an organic EL display, or the like. The display unit 50 displays a captured image obtained by the imaging unit 20 on the basis of an image signal supplied from the control unit 30. In addition, a touch panel of the user interface unit 40 is provided on a screen of the display unit 50 to configure a graphical user interface. Thus, when a user manipulates the touch panel in accordance with screen display, various kinds of setting, operation switching, and the like of the imaging system 10 can be realized.

A recording medium is fixed or detachably mounted on the recording reproduction unit 60, and an image signal of a captured image supplied from the control unit 30 is recorded. In addition, the recording reproduction unit 60 reads a recorded image signal in response to a request from the control unit 30 and outputs the image signal to the control unit 30. Accordingly, a captured image recorded on the recording reproduction unit 60 can be displayed on the display unit 50.

<2. First Embodiment of Auto-Focus Control>

Next, a first embodiment of the auto-focus control will be described. In the first embodiment, when a subject is in focus in the ranging area, a focus change desired by the user can be performed. That is, in a case in which a defocus amount detected in the ranging area within an imaging screen is greater than a driving control determination threshold set in advance, the focus driving control unit performs speed priority driving control in which the focus lens is driven to a focusing position in a driving pattern selected in accordance with a driving pattern set in advance, for example, a driving pattern selected according to a user manipulation on the user interface unit.

In addition, in the first embodiment, a state in which a subject is in focus in the ranging area can be maintained. That is, in a case in which the defocus amount is equal to or less than a driving control determination threshold, the focus driving control unit performs subject priority driving control in which a focus lens movement amount by which the focus lens is located at a focusing position in accordance with the defocus amount is set and the focus lens is driven.

Figure 2:
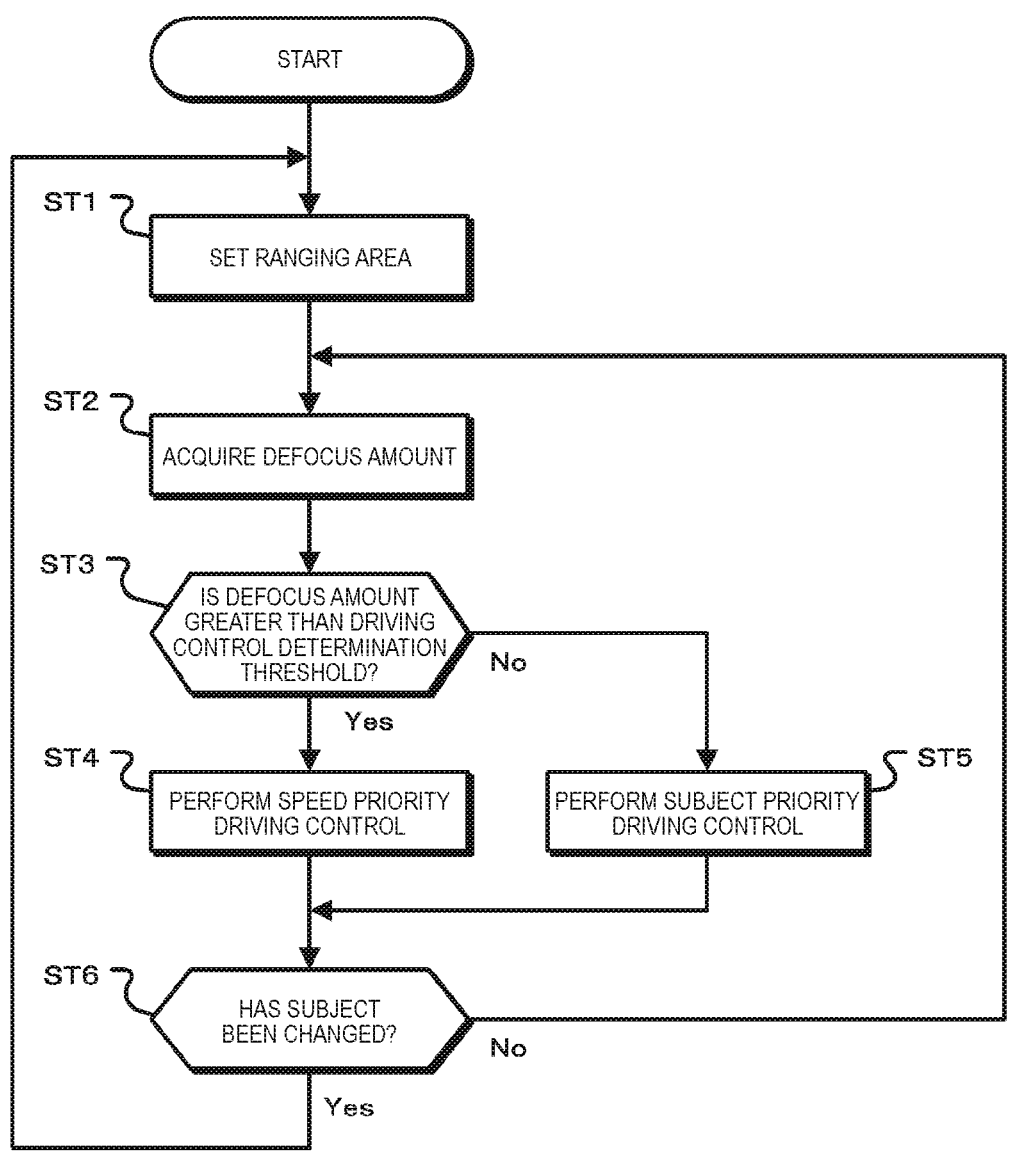
FIG. 2 is a flowchart illustrating an operation according to a first embodiment.

FIG. 2 is a flowchart illustrating an operation according to the first embodiment. In step ST1, the focus driving control unit sets a ranging area. The focus driving control unit 34 sets the ranging area within the imaging screen on the basis of a manipulation signal from the user interface unit 40, and thus the process proceeds to step ST2.

Figure 3:
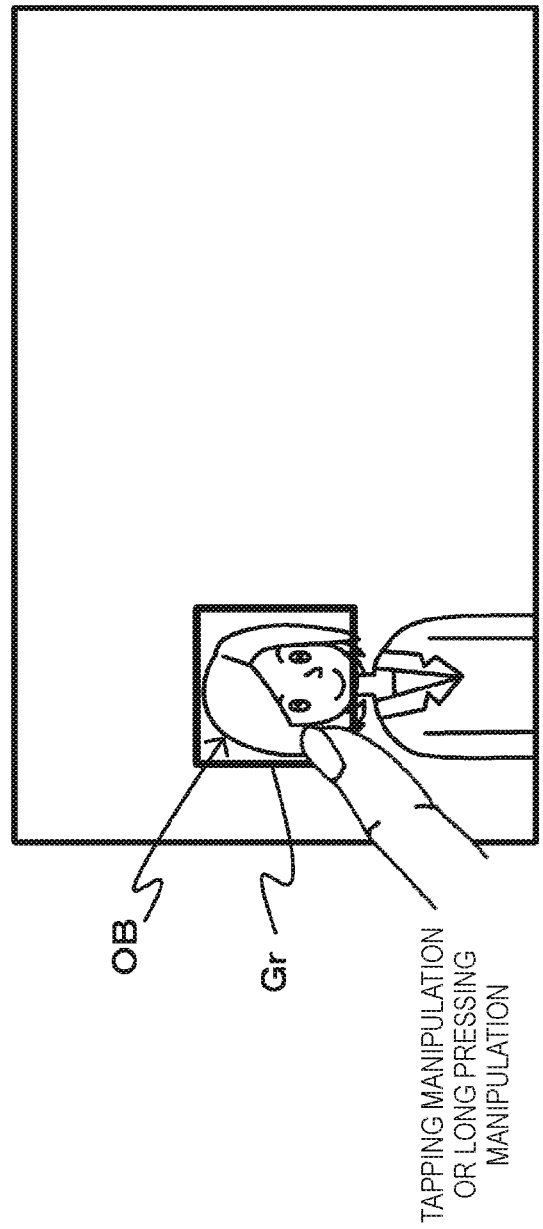
FIG. 3 is an explanatory diagram illustrating an operation of setting a ranging area (a case in which a ranging area is set according to a tapping manipulation or a long pressing manipulation).

FIGS. 3 to 6 are explanatory diagrams illustrating operations of setting ranging areas. FIG. 3 illustrates a case in which a ranging area is set according to a tapping manipulation or a long pressing manipulation. A user performs a tapping manipulation or a long pressing manipulation on the position of a desired subject OB. In a case in which it is detected that a tapping manipulation or a long pressing manipulation is performed on the basis of a manipulation signal from the user interface unit 40, the focus driving control unit 34 sets a ranging area (an area surrounded by a ranging frame Gr) so that a manipulation position is included.

Note that the ranging area may be a point designated according to a tapping manipulation or a long pressing manipulation.

Figure 4:
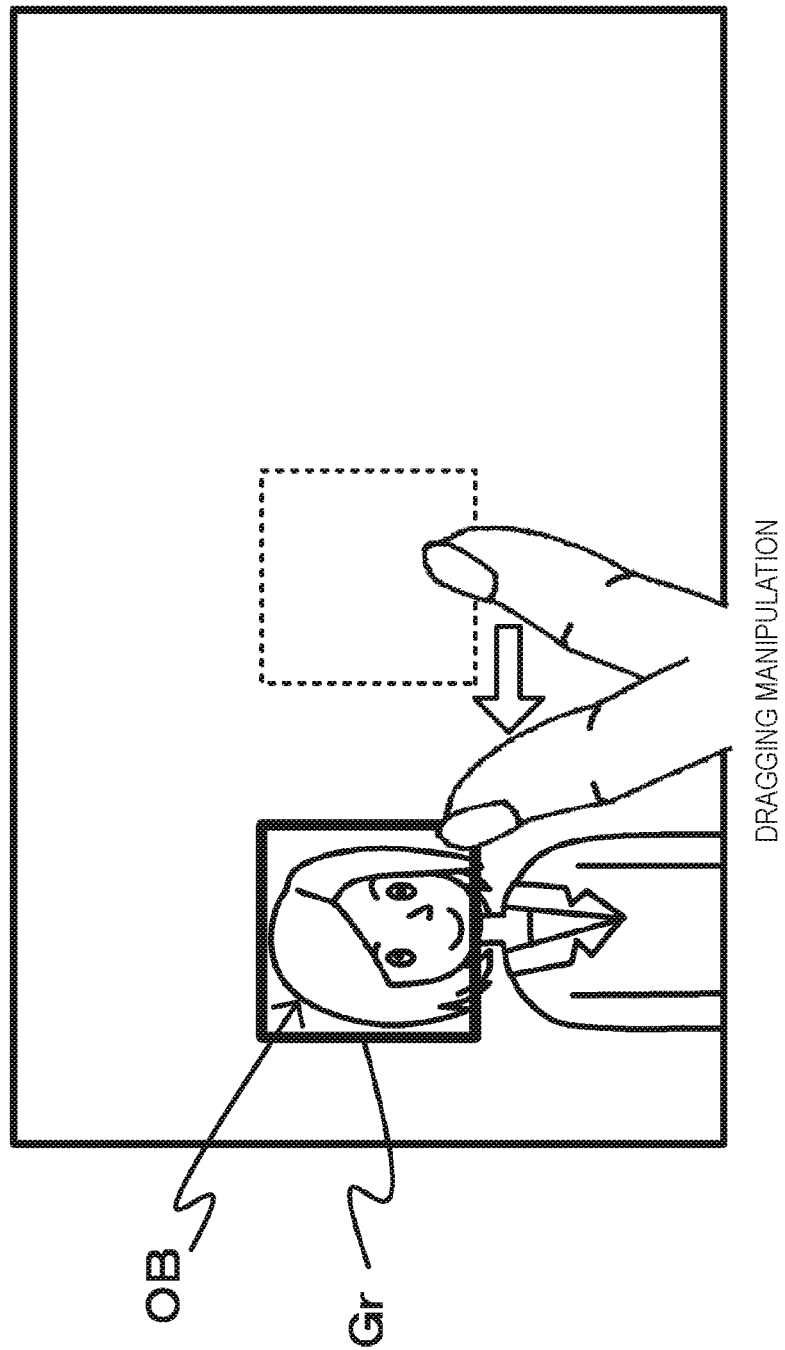
FIG. 4 is an explanatory diagram illustrating an operation of setting a ranging area (a case in which a ranging frame is moved to a display position of a desired subject and a ranging area is set).

FIG. 4 illustrates a case in which the ranging frame is moved to a display position of a desired subject and the ranging area is set. The focus driving control unit 34 displays the ranging frame Gr indicating the ranging area on the screen. The user performs a dragging manipulation of moving the ranging frame Gr from a position indicated by a dotted line to the position of the desired subject OB. In a case in which it is determined that the dragging manipulation is performed on the basis of a manipulation signal from the user interface unit 40, the focus driving control unit 34 sets an area surrounded by the ranging frame Gr after the movement as a ranging area.

Figure 5:
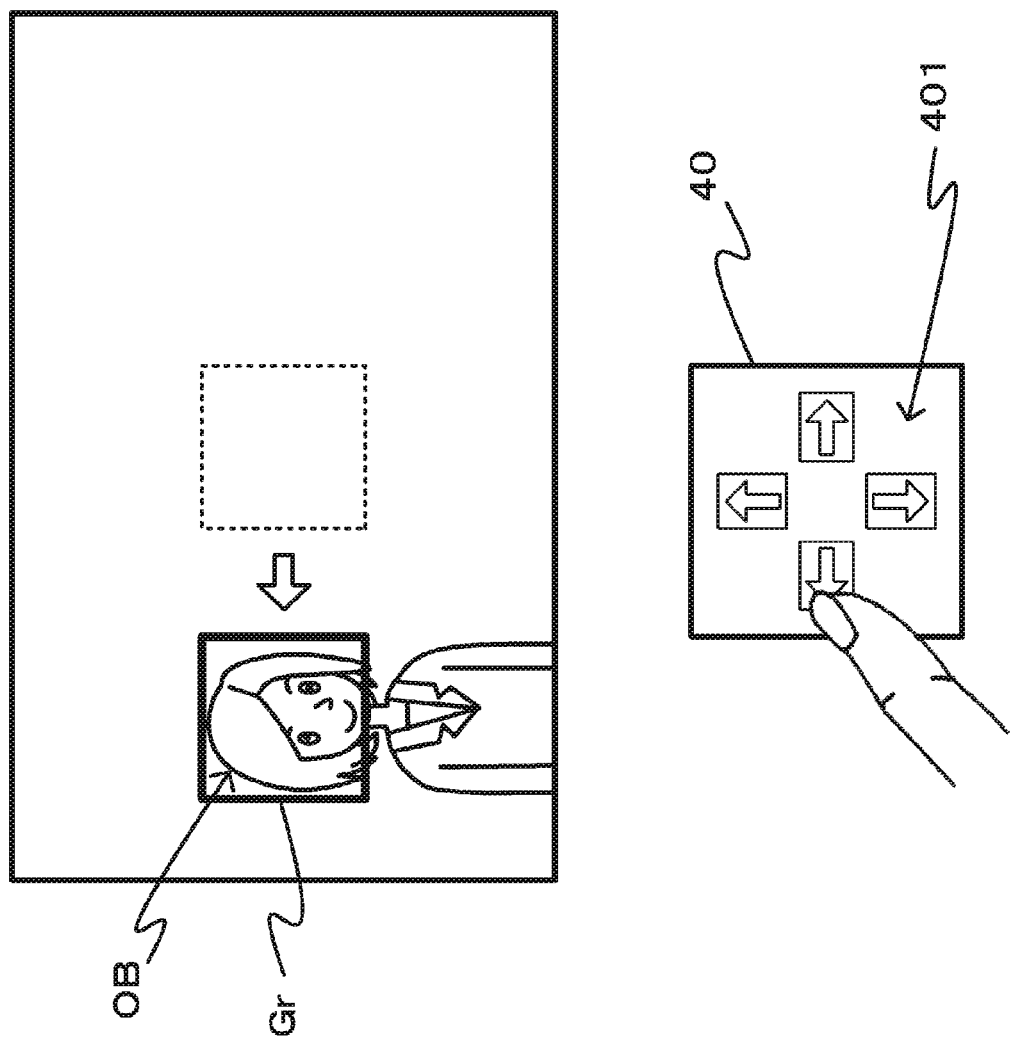
FIG. 5 is an explanatory diagram illustrating an operation of setting a ranging area (a case in which a ranging frame is moved according to a switching manipulation and a ranging area is set).

FIG. 5 illustrates a case in which the ranging frame is moved according to a switching manipulation and a ranging area is set. The user manipulates a movement key (a cross key, a joystick, or the like) 401 of the user interface unit 40 to move the ranging frame Gr from the position indicated by a dotted line to a position of the desired subject OB. In a case in which it is detected the manipulation of moving the ranging frame Gr is performed on the basis of a manipulation signal from the user interface unit 40, the focus driving control unit 34 sets an area surrounded by the ranging frame Gr after the movement as a ranging area.

Figure 6:
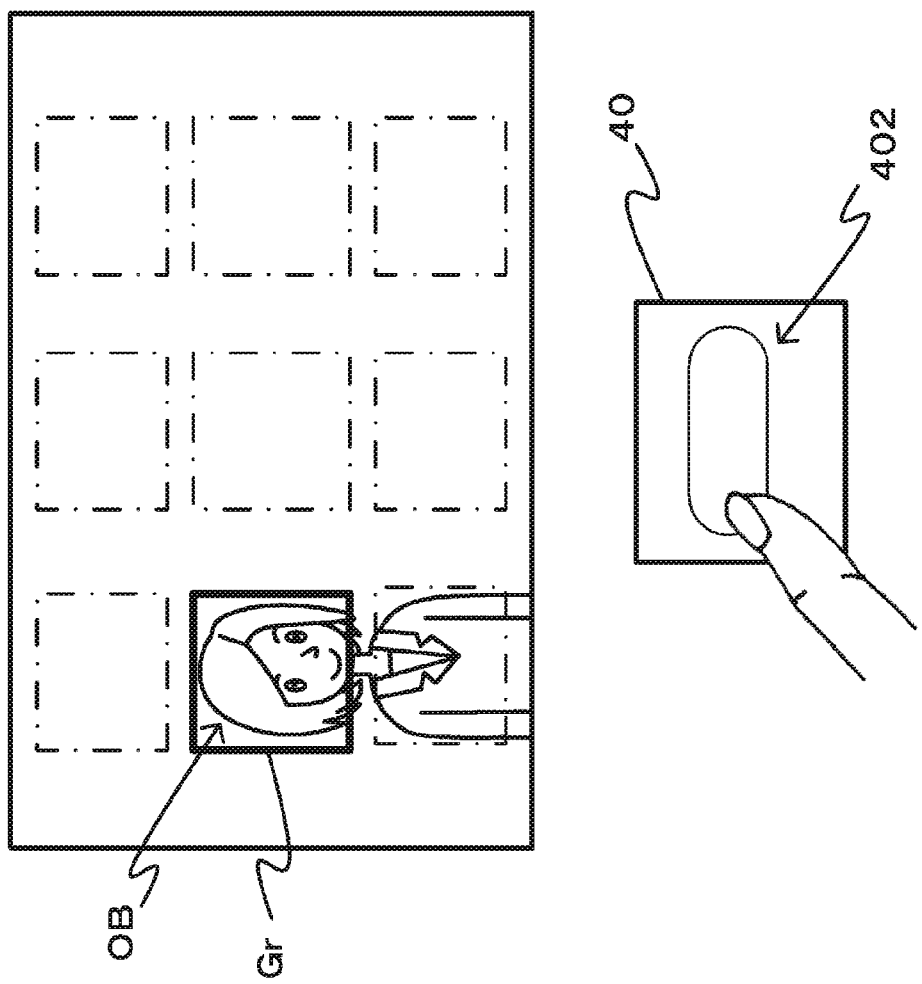
FIG. 6 is an explanatory diagram illustrating an operation of setting a ranging area (a case in which a ranging area is selected from ranging areas registered in advance).

FIG. 6 illustrates a case in which a ranging area is selected from ranging areas registered in advance. The user manipulates a selection key 402 of the user interface unit 40 to select the ranging frame Gr at the position of the desired object OB. Note that a ranging frame for which frames indicated by one-dot chain lines can be selected is exemplified. In a case in which it is detected that a manipulation of selecting the ranging frame Gr is performed on the basis of a manipulation signal from the user interface unit 40, the focus driving control unit 34 sets an area surrounded by the ranging frame Gr selected by the user as a ranging area.

Referring back to FIG. 2, in step ST2, the focus driving control unit acquires a defocus amount. The focus driving control unit 34 acquires the defocus amount of the subject included in the ranging area set in step ST1 from the defocus detection unit 32. For example, in a case in which an image sensor in which image-surface phase difference detection pixels are provided in the imaging unit 20 is used, the focus driving control unit 34 acquires a defocus amount detected from a phase difference calculated using the image-surface phase difference detection pixels within the ranging area from the defocus detection unit 32. In addition, in a case in which a distance to the subject is measured by the ranging unit 25, the focus driving control unit 34 acquires a defocus amount detected from the distance to the subject within the ranging area and a current position of the focus lens from the defocus detection unit 32. The focus driving control unit 34 acquires the defocus amount of the ranging area from the defocus detection unit 32, and then the process proceeds to step ST3.

In step ST3, the focus driving control unit determines whether the defocus amount is greater than the driving control determination threshold. In a case in which the defocus amount of the ranging area acquired in step ST2 is greater than the driving control determination threshold set in advance, the focus driving control unit 34 causes the process to proceed to step ST4. In a case in which the defocus amount is equal to or less than the driving control determination threshold, the process proceeds to step ST5.

In step ST4, the focus driving control unit performs the speed priority driving control. In a case in which the focus driving control unit 34 performs the speed priority driving control, the focus driving control unit 34 generates a focus driving control signal for driving the focus lens to a focusing position in a driving pattern selected in advance by the user and outputs the focus driving control signal to the imaging unit 20, and then the process proceeds to step ST6.

FIG. 7 exemplifies driving patterns which can be selected through speed priority driving control. (a) of FIG. 7 illustrates a case in which a movement speed of the focus lens is constant. In a case in which the user selects a driving pattern CVa in which the movement speed of the focus lens is fast, a time from a position Ps at the time of driving start of a focus position to a focusing position Pf, that is, a time until a captured image becomes an image in which the subject of the ranging area is in focus, is shortened. In addition, in a case in which the user selects a driving pattern CVb in which the movement speed is slow, a time until the captured image becomes an image focused on the subject of the ranging area is lengthened.

(b) of FIG. 7 exemplifies a case in which a movement speed of the focus lens is not constant. A driving pattern CVc indicates a case in which the movement speed decreases over time. In a case in which the user selects the driving pattern CVc, the captured image becomes an image in which a blurring decrease status is inferior with a decrease in blurring.

A driving pattern CVd indicates a case in which the movement speed is faster than in other periods at the time of driving start of the focus driving control and at the time of approach of focus to the focusing position. For example, in a case in which the blurring decrease status is inconspicuous even when blurring at the time of focus control start is large and the focus lens is moved, the focus lens can be moved fast at a lens position at which the blurring decrease status is inconspicuous as long as the driving pattern CVd is selected. In addition, the movement speed is considered to be fast when the focus lens approaches the focusing position. Therefore, for example, when blurring is small and inconspicuous, a focusing state is achieved quickly. Accordingly, when the driving pattern CVd is selected, it is possible to generate a captured image in which a change in blurring is considerable during a period until the focusing state is achieved.

Note that in the speed priority driving control, a movement amount of the focus lens may be set in accordance with the acquired defocus amount. In this case, setting of the movement amount is performed whenever the defocus amount is acquired. Therefore, it is possible to perform an operation similar to a case in which the movement speed is set, and it is possible to perform the speed priority driving control such as the driving patterns of FIG. 7.

In this way, the focus driving control unit 34 drives the focus lens to the focusing position in a driving pattern selected by the user at the time of the speed priority driving control, and thus the captured image in which a focus change desired by the user is made can be generated by the imaging unit 20. Accordingly, at the time of imaging of a moving image, the user can use, for example, a change in blurring until adjustment of focus on a subject of a ranging area as an effect.

Referring back to FIG. 2, when the process proceeds from step ST3 to step ST5, the focus driving control unit performs the subject priority driving control. In a case in which the focus driving control unit 34 performs the subject priority driving control, the focus driving control unit 34 generates a focus driving control signal for setting a focus lens movement amount by which the focus lens is located at the focusing position in accordance with the defocus amount and driving the focus lens and outputs the focus driving control signal to the imaging unit 20, and then the process proceeds to step ST6.

FIG. 8 is an explanatory diagram illustrating subject priority driving control. In the subject priority driving control, focus control in which trackability is prioritized and focus control in which stability is prioritized is performed.

(a) of FIG. 8 illustrates the focus control in which trackability is prioritized. In a case in which the focus control in which trackability is prioritized is performed, the focus driving control unit 34 sets a focus lens movement amount so that the defocus amount is minimized and generates a focus driving control signal. Accordingly, the focus lens is moved to a focusing position (indicated by a black circle) based on the ranging information in sequence, and thus it is possible to perform an auto-focus operation in which trackability is good.

(b) of FIG. 8 illustrates the focus control in which stability is prioritized. In a case in which the focus control operation in which stability is prioritized is performed, the focus driving control unit 34 sets a focus lens movement amount so that the smoothed defocus amount obtained by smoothing the defocus amount in a time direction or a spatial direction is minimized and generates a focus driving control signal. For example, the focus driving control unit 34 performs calculating a moving average with regard to the defocus amount and calculates an average value (a smoothed defocus amount) of the defocus amounts acquired during a predetermined period in the past direction from the present over time in sequence. In addition, the focus driving control unit 34 sets a focus lens movement amount so that the calculated average value is minimized and generates a focus driving control signal. Accordingly, the focus lens is moved to a focusing position (indicated by a white circle) based on the ranging information after the smoothing in sequence, and thus it is possible to perform an auto-focus operation in which stability is good. In addition, in the focus control in which stability is prioritized, smoothing the defocus amount is performed. For example, even in a case in which an error occurs in the ranging information, a captured image is less likely to become an image in which blurring occurs due to the error of the ranging information. Note that the black circle indicates a focusing position based on the ranging information before the smoothing is performed.

The focus driving control unit 34 performs focus control in which trackability is prioritized in accordance with a motion state of a subject of the ranging area (trackability priority control), focus control in which stability is prioritized (stability priority control), or focus control in which precision is prioritized (precision priority control), as will be described below. The focus driving control unit 34 performs the focus control in which trackability is prioritized in a case in which the subject of the ranging area is a moving subject, and performs the focus control in which stability is prioritized in a case in which the subject of the ranging area is a stationary subject. By selecting the focus control in this way, the imaging unit 20 can continuously adjust focus with high precision in a case in which the subject is moving, and can cause focus deviation to rarely occur in a case in which the subject is stationary. Further, the focus driving control unit 34 may perform focusing in which trackability and stability are compatible by determining a situation of the subject such as whether the subject of the ranging area is a moving subject or a stationary subject and setting the focus movement amount calculated by adaptively switching a score of the average value in accordance with the result.

The determination of whether the subject of the ranging area is a moving subject or a stationary subject may be determination performed using the defocus amount or may be determination performed using a captured image of the subject. For example, the defocus amount is a small value in a case in which the defocus amount is in a focusing state. Thus, the subject is determined to be a moving subject in a case in which the subject for which the defocus amount is a small value is moving from the ranging area. In addition, in a case in which a change in a depth direction detected on the basis of the defocus amount, that is, a change amount of an image magnification, is greater than a threshold set in advance and in a case in which a trend (inclination) of focus movement from the past to the present is greater than a threshold set in advance, the subject is determined to be a moving subject. In addition, in a case in which an image-surface speed is faster than a threshold set in advance, the subject may be determined to be a moving subject. In a case in which a captured image of the subject is used, for example, a matching process for a captured image after elapse of a time using a subject image of the ranging area is performed. In a case in which a matching position in the captured image is moved from the ranging area, the subject is determined to be a moving subject. Further, whether the subject of the ranging area is a moving subject or a stationary subject may be determined in accordance with an imaging mode. For example, when the imaging mode is a portrait mode in which a person of the subject is favored, the subject may be determined to be a stationary subject. When the imaging mode is a sports mode on the assumption of imaging of a subject with a motion, the subject may be determined to be a moving subject.

Figure 9:
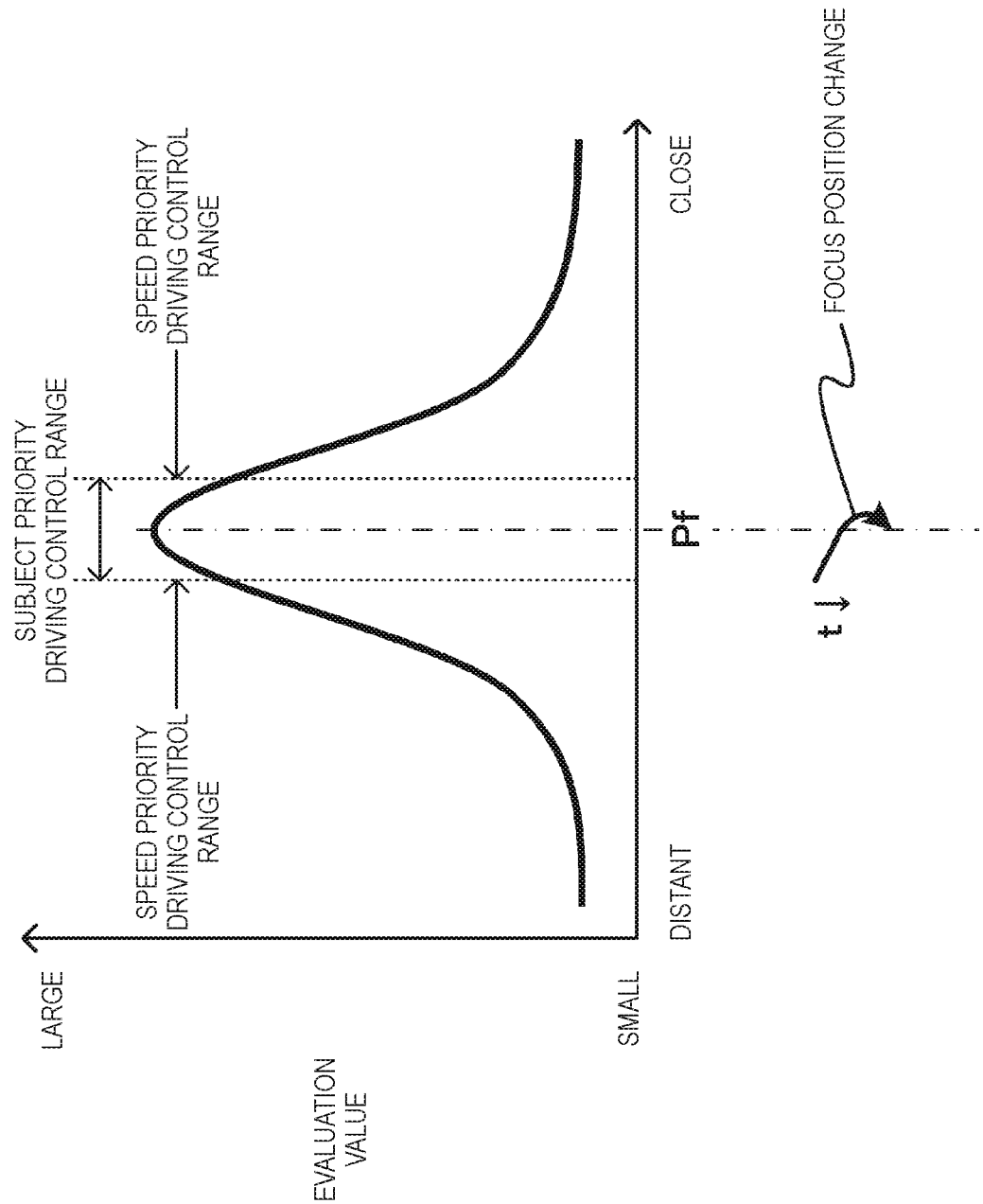
FIG. 9 is an explanatory diagram illustrating subject priority driving control in which precision is prioritized.

In addition, in the subject priority driving control, the focus driving control unit 34 may perform the focus control in which precision is prioritized. FIG. 9 is an explanatory diagram illustrating the subject priority driving control in which precision is prioritized. In a case in which the focus control in which precision is prioritized is performed, the focus driving control unit 34 changes the defocus amount and uses an evaluation value calculated from an image of an evaluation value calculation region including the ranging area. The focus driving control unit 34 extracts a high frequency component from an image signal of the evaluation value calculation region and calculates an evaluation value in accordance with sharpness of the subject image. Note that the evaluation value is set so that the value increases as the focus approaches the subject and the sharpness of the subject image increases. The focus driving control unit 34 moves the focus lens in accordance with the focus driving control signal and determines a direction in which the sharpness increases as a focusing direction. Further, the focus driving control unit 34 moves the focus lens in accordance with the focus driving control signal in the focusing direction and determines a focusing position Pf at which the sharpness is the maximum, and then moves the focus lens to the focusing position. By performing the focus control in conformity with the so-called contrast scheme (or a climbing scheme), the imaging unit 20 can generate a captured image with high sharpness of the subject of the ranging area. Note that, in the subject priority driving control in which precision is prioritized, the focus lens is moved to determine the focusing position. Thus, in a case in which the subject of the ranging area is a stationary subject, the subject priority driving control in which precision is prioritized may be performed.

Referring back to FIG. 2, in step ST6, the focus driving control unit determines whether the subject is changed. In a case in which it is determined that the user changes the subject on which focus is adjusted on the basis of the manipulation signal or a case in which the subject on which focus is adjusted is automatically changed, the focus driving control unit 34 returns the process to step ST1 and sets a ranging area by causing the ranging area to correspond to the subject after the change. Conversely, in a case in which it is determined that the subject is not changed, the focus driving control unit 34 returns the process to step ST2 and causes a state in which the subject of the ranging area is in focus to be maintained by acquiring the defocus amount for the subject of the ranging area.

FIG. 10 is an explanatory diagram illustrating an operation of changing a subject. The focus driving control unit 34 allows a ranging area to be registered and determines that the subject is changed in a case in which the ranging area is switched to the registered ranging area. (a) of FIG. 10 exemplifies a ranging area registered in advance by the user, and the ranging area is surrounded by a ranging frame Grs. (b) of FIG. 10 exemplifies a current ranging area, and the ranging area is surrounded by a ranging frame Gra. Here, when the desired subject OB is entered within the registered ranging area (within an area surrounded by the ranging frame Grs), the user manipulates a ranging area reading switch 403 of the user interface unit 40. In a case in which it is detected that a manipulation of reading the registered ranging area is performed on the basis of a manipulation signal from the user interface unit 40, the focus driving control unit 34 is assumed to switch the ranging area from the area of the ranging frame Gra to the area of the ranging frame Grs and change the subject. In this way, the focus driving control unit 34 allows a ranging area to be registered and allows the registered ranging area to be read at any timing. Accordingly, for example, in a case in which the composition of a captured image is decided, a ranging area is registered at a desired position and the user reads the ranging area registered at a timing at which a desired subject is located at the position of the ranging area and performs switching of the ranging area. In this way, it is possible to easily adjust focus on the desired subject.

Figure 11:
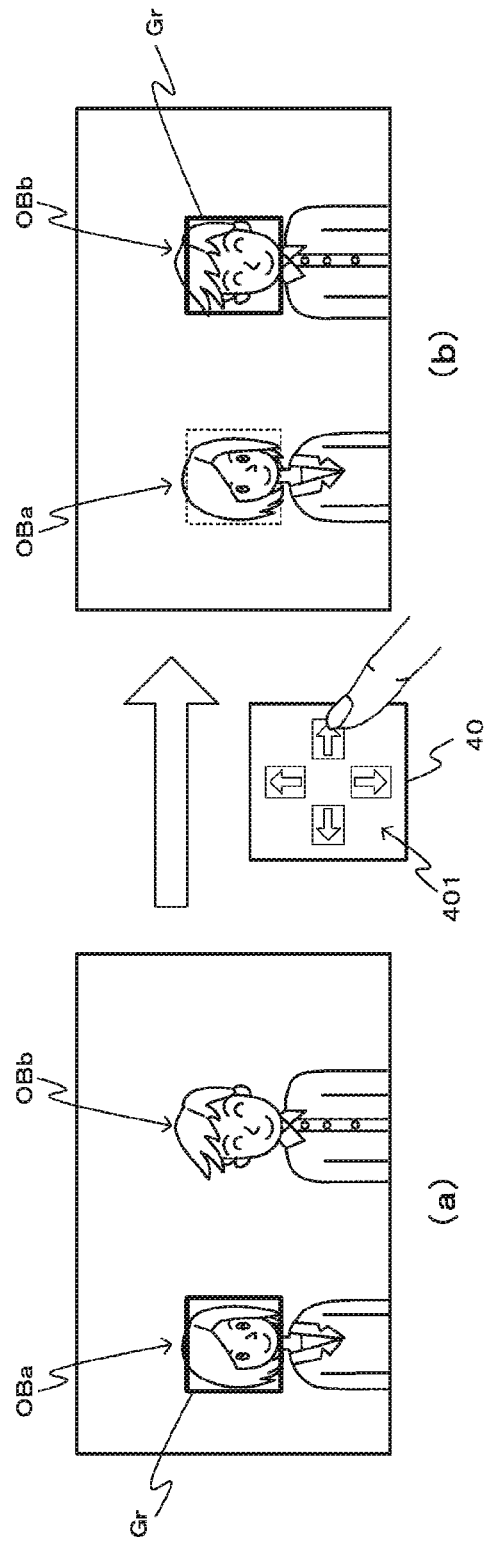
FIG. 11 is an explanatory diagram illustrating another operation of changing a subject.

FIG. 11 is an explanatory diagram illustrating another operation of changing a subject. It is assumed that the focus driving control unit 34 allows a ranging area to move in accordance with a user manipulation and change the subject when movement of the ranging area is completed. (a) of FIG. 11 exemplifies a ranging area before movement, and the ranging area is surrounded by the ranging frame Gr at the position of a subject OBa.

In a case in which the user desires to adjust focus on a subject OBb, the user manipulates a movement key 401 of the user interface unit 40 to move the ranging frame Gr to the position of the desired subject OBb. Even in a case in which it is detected that a manipulation of moving the ranging frame Gr is performed on the basis of a manipulation signal from the user interface unit 40, the focus driving control unit 34 sets the area surrounded by the ranging frame Gr after the movement, as illustrated in (b) of FIG. 11, as a ranging area. In this way, when the ranging area can be moved, for example, in a case in which the composition of a captured image is not decided or a case in which the position of a desired subject may not be ascertained, focus can be easily adjusted on the desired subject. Note that the operations of FIGS. 10 and 11 may be performed in the setting of the ranging area in step ST1.

In this way, according to the first embodiment of the auto-focus control, in a case in which the defocus amount is greater than the driving control determination threshold, focus driving control in which speed is prioritized is performed so that it is possible to generate a captured image in which a focus change desired by the user can be made. In addition, in a case in which the defocus amount is equal to or less than the driving control determination threshold, the auto-focus operation can be performed prioritizing trackability, stability, or precision. Therefore, the focus driving control in which a subject is prioritized can be performed so that a state in which a desired subject is in focus can be maintained with high precision. In this way, since the focus driving control is switched in accordance with the defocus amount, a change in blurring until adjustment of focus on a subject of the ranging area can be used as an effect and the state in which the focus is adjusted can be continuously maintained at the time of adjustment of focus on the subject. Accordingly, it is possible to perform the auto-focus operation with the high degree of freedom and with high performance. In addition, the focus driving control unit may perform the focus driving control using the evaluation value in accordance with the sharpness of the subject image calculated by extracting the high frequency component from the image signal. In this case, the focus driving control unit acquires, for example, an evaluation value in accordance with sharpness of the subject image in an evaluation value calculation region including the ranging area and compares the acquired evaluation value with the driving control determination threshold set for the evaluation value. The focus driving control unit performs the speed priority driving control in a case in which the evaluation value is less than a driving control determination threshold for which the evaluation value is set in advance so that the sharpness of the subject image is low. The focus driving control unit performs the subject priority driving control in a case in which the evaluation value is equal to or greater than the driving control determination threshold. In this way, even in a case in which the evaluation value in accordance with the sharpness of the subject image is used in the focus driving control unit, the imaging system can obtain a similar operational effect to a case in which the defocus amount is used.

<3. Second Embodiment of Auto-Focus Control>

Next, a second embodiment of the auto-focus control will be described. In the second embodiment, a case in which switching a region size of a ranging area is performed in accordance with a defocus amount will be described. In a case in which the defocus amount is greater than a ranging area determination threshold set in advance, the focus driving control unit sets the ranging area to a ranging size at the time of speed priority driving which is a region size set in advance. Conversely, in a case in which the defocus amount is equal to or less than the ranging area determination threshold, the focus driving control unit sets the ranging area to a subject priority ranging size which is a region size different from the ranging size at the time of the speed priority driving. Note that, in a case in which the ranging area determination threshold is the same value as the driving control determination threshold, the ranging size at the time of the speed priority driving is a ranging size in the speed priority driving control and the subject priority ranging size is a ranging size in the subject priority driving control.

Figure 12:
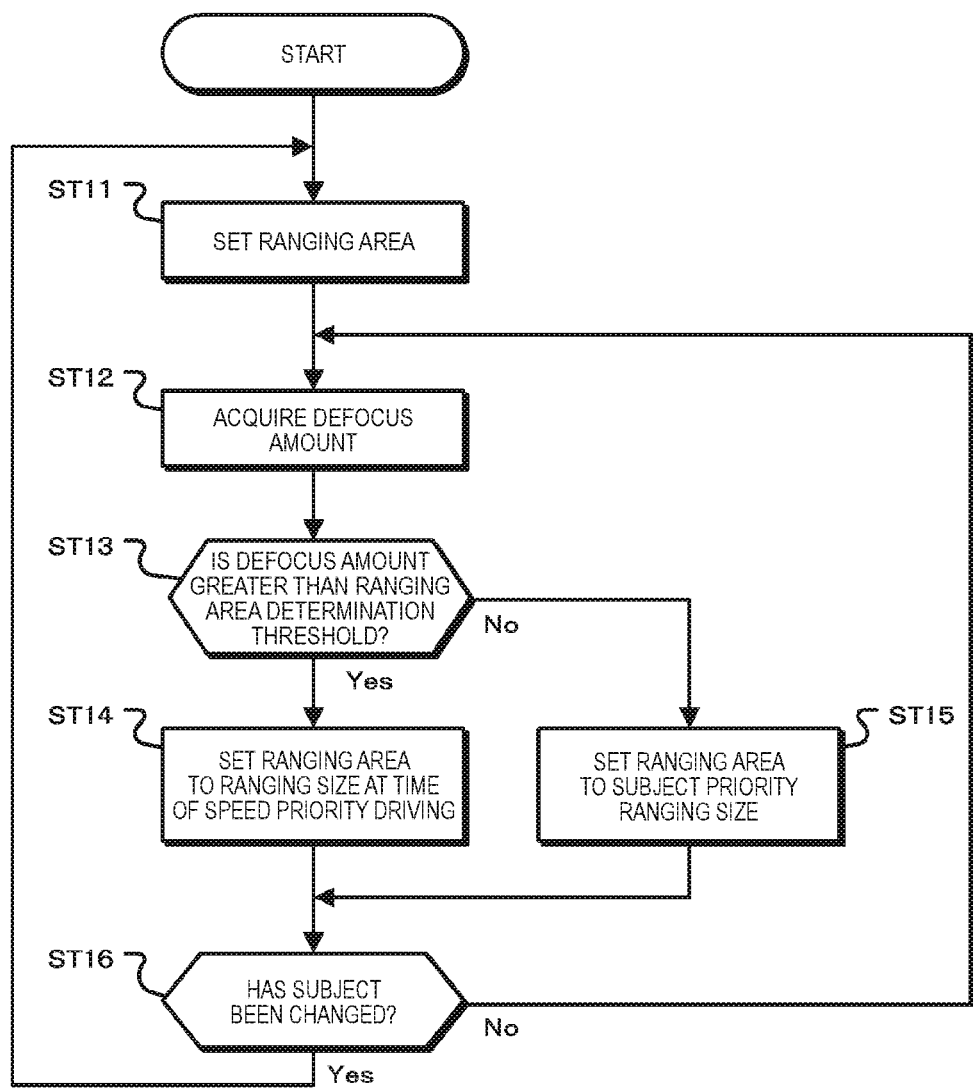
FIG. 12 is a flowchart illustrating an operation according to a second embodiment.

FIG. 12 is a flowchart illustrating an operation according to a second embodiment. In step ST11, the focus driving control unit sets a ranging area. The focus driving control unit 34 sets a ranging area within the imaging screen on the basis of a manipulation signal from the user interface unit 40 and causes the process to proceed to step ST12. Note that the setting of the ranging area is performed similar to the operation of setting the ranging area in FIGS. 3 to 6 described above.

In step ST12, the focus driving control unit acquires a defocus amount. The focus driving control unit 34 acquires the defocus amount of a subject included in the ranging area set in step ST11 from the defocus detection unit 32. For example, the focus driving control unit 34 acquires a defocus amount detected from a phase difference or a defocus amount detected from a distance to the subject within the ranging area, a current position of the focus lens, and the like, as in the above-described step ST2, and then the process proceeds to step ST13.

In step ST13, the focus driving control unit determines whether the defocus amount is greater than the ranging area determination threshold. In a case in which the defocus amount of the ranging area acquired in step ST12 is greater than the ranging area determination threshold set in advance, the focus driving control unit 34 causes the process to proceed to step ST14. In a case in which the defocus amount is equal to or less than the ranging area determination threshold, the process proceeds to step ST15.

In step ST14, the focus driving control unit sets the ranging area to the ranging size at the time of the speed priority driving. The focus driving control unit 34 sets the ranging area to the ranging size at the time of the speed priority driving which is a region size set in advance. In addition, the focus driving control unit 34 generates a focus driving control signal for driving the focus lens to a focusing position on the basis of a ranging result of the ranging area and outputs the focus driving control signal to the imaging unit 20, and then the process proceeds to step ST16.

Figure 13:
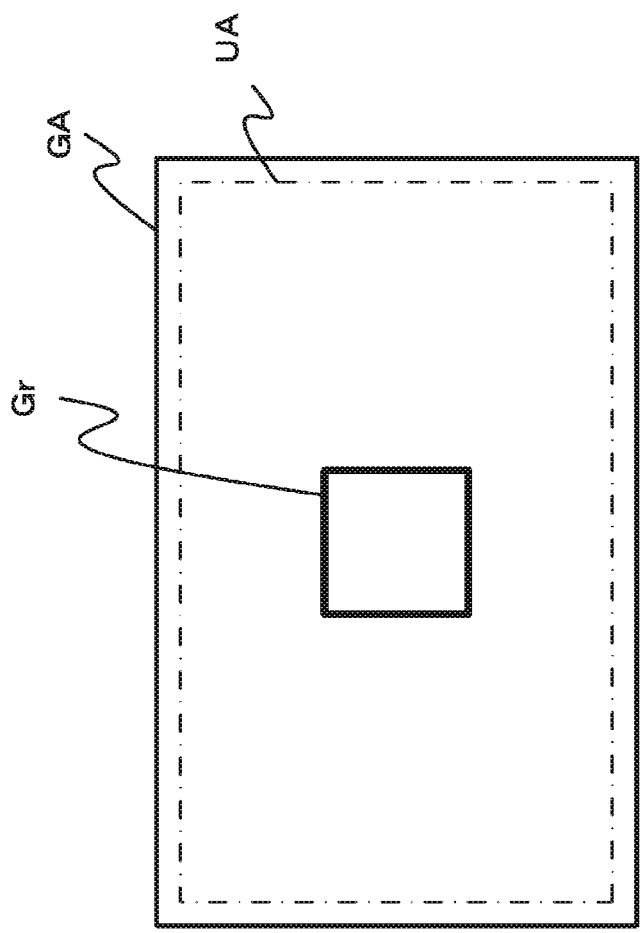
FIG. 13 is an explanatory diagram illustrating a case in which a ranging area has a ranging size at the time of speed priority driving.

FIG. 13 is an explanatory diagram illustrating a case in which a ranging area has a ranging size at the time of speed priority driving. In the display unit 50 of the imaging system 10, a user interface region UA is set in an imaging screen GA and a manipulation signal is generated in accordance with a user manipulation within the region of the user interface region UA. In a case in which a desired subject is desired to be in focus, the user performs a manipulation of setting a ranging frame at a desired position, as described above. The focus driving control unit 34 sets an area surrounded by the ranging frame Gr set on the basis of a manipulation signal as a ranging area. In addition, a region size of the ranging area is set as a ranging size at the time of speed priority driving set in advance. The focus driving control unit 34 generates a focus driving control signal on the basis of a ranging result of the set ranging area and outputs the focus driving control signal to the imaging unit 20. Accordingly, a captured image becomes an image in which a desired subject is in focus.

Referring back to FIG. 12, in step ST15, the focus driving control unit sets the ranging area to the subject priority ranging size. The focus driving control unit 34 sets the ranging area to the subject priority ranging size which is a region size different from the ranging size at the time of the speed priority driving. In addition, the focus driving control unit 34 generates a focus control signal on the basis of a ranging result of the ranging area and outputs the focus control signal to the imaging unit 20, and then the process proceeds to step ST16.

Figure 14:
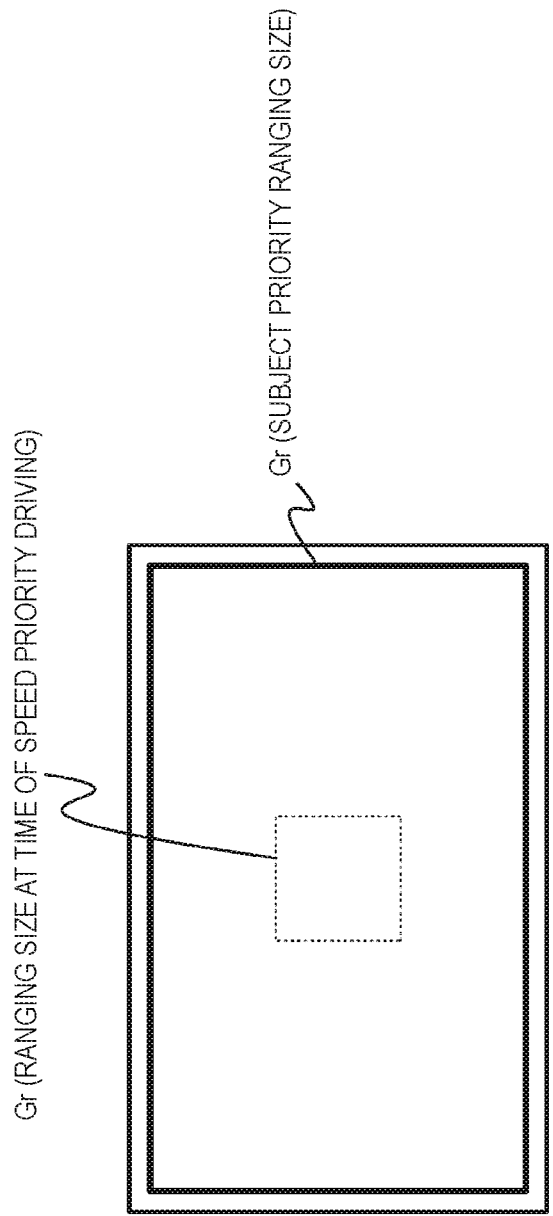
FIG. 14 is an explanatory diagram illustrating a case in which a ranging area has a subject priority ranging size.

FIG. 14 is an explanatory diagram illustrating a case in which a ranging area is considered to have the subject priority ranging size. When the desired subject moves, the desired subject deviates from the ranging area which is the ranging size at the time of the speed priority driving, and thus the focus may not be caused to track the desired subject. Accordingly, the focus driving control unit 34 sets the ranging area to the subject priority ranging size which is a region size larger than the ranging size at the time of the speed priority driving so that the focus can track the desired subject even when the subject moves. Note that FIG. 14 exemplifies a case in which the subject priority ranging size is set to the region size of the entire imaging screen. In this way, since the subject priority ranging size is set to the region size larger than the ranging size at the time of the speed priority driving, the desired subject does not deviate from the ranging area even when the desired subject moves. Accordingly, by generating a focus control signal in accordance with a ranging result of the ranging area considered to be the subject priority ranging size and outputting the focus control signal to the imaging unit 20, the captured image becomes an image in which a state in which the subject is in focus is maintained even when the desired subject moves.

Referring back to FIG. 12, in step ST16, the focus driving control unit determines whether the subject is changed. In a case in which it is determined that the user changes the subject which is in focus on the basis of a manipulation signal or a case in which the focus driving control unit 34 automatically changes the subject which is in focus, the focus driving control unit 34 returns the process to step ST11 and sets the ranging area in correspondence with the subject after the change. Conversely, in a case in which it is determined that the subject is not changed, the focus driving control unit 34 returns the process to step ST12 and causes the state in which the subject of the ranging area is in focus to be maintained by acquiring the defocus amount with respect to the subject of the ranging area. Note that it is sufficient if the change in the subject is determined similarly to the first embodiment.

In this way, in a case in which the defocus amount is greater than the ranging area determination threshold, the focus driving control unit 34 sets the ranging area to the ranging size at the time of the speed priority driving and performs the focus control. Conversely, in a case in which the defocus amount is equal to or less than the ranging area determination threshold, the focus driving control unit 34 sets the ranging area to the subject priority ranging size larger than the ranging size at the time of the speed priority driving and performs the focus control. Accordingly, not only can focus be adjusted on the desired subject but the focus can also be caused to track the moving subject more reliably. Thus, it is possible to easily perform the stable auto-focus operation. In addition, in a case in which a motion direction or a motion amount of the subject is apparent, the ranging area of the subject priority ranging size can be set at a position corresponding to the subject moving when a standard position (for example, a median position) of the ranging area is moved in the motion direction or by the motion amount of the subject. In addition, the focus driving control unit may perform switching the region size of the ranging area using the evaluation value indicating the sharpness of the subject image calculated by extracting the high frequency component from the image signal. In this case, the focus driving control unit acquires the evaluation value in accordance with the sharpness of the subject image of an evaluation value calculation region including, for example, the ranging area and compares the ranging area determination threshold set for the evaluation value with the acquired evaluation value. The focus driving control unit sets the ranging area to the ranging size at the time of the speed priority driving in a case in which the evaluation value is less than the ranging area determination threshold so that the sharpness of the subject image is low. The focus driving control unit sets the ranging area to the subject priority ranging size in a case in which the evaluation value is equal to or greater than the ranging area determination threshold. In this way, even in a case in which the evaluation value in accordance with the sharpness of the subject image is used in the focus driving control unit, the imaging system can obtain a similar operational effect to a case in which the defocus amount is used.

FIG. 15 is a diagram illustrating an operation example according to the second embodiment. (a) of FIG. 15 exemplifies a captured image before the focus control operation starts. Since the subject OB is out of focus in this image, an image of the subject OB is blurred. As illustrated in (b) of FIG. 15, the desired subject OB is set to be included in the ranging area using the ranging frame Gr as the position of the subject OB. The ranging size of the ranging area at this time is set as a size in which ranging result indicates the defocus amount of the subject OB, for example, a ranging size at the time of the speed priority driving. When the ranging area is set in this way, the focus driving control unit performs the focus driving control on the basis of, for example, the defocus amount of the ranging area and the captured image becomes an image in which the subject OB is not blurred, as illustrated in (c) of FIG. 14. In addition, since the subject OB is in focus and thus the defocus amount is equal to or less than the ranging area determination threshold, as illustrated in (d) of FIG. 15, the ranging area is changed to the subject priority ranging size larger than the ranging size at the time of the speed priority driving. Accordingly, even when the subject OB moves, the focus can be caused to track the subject OB. Therefore, the captured image becomes an image in which the subject OB is not blurred.

Figure 16:
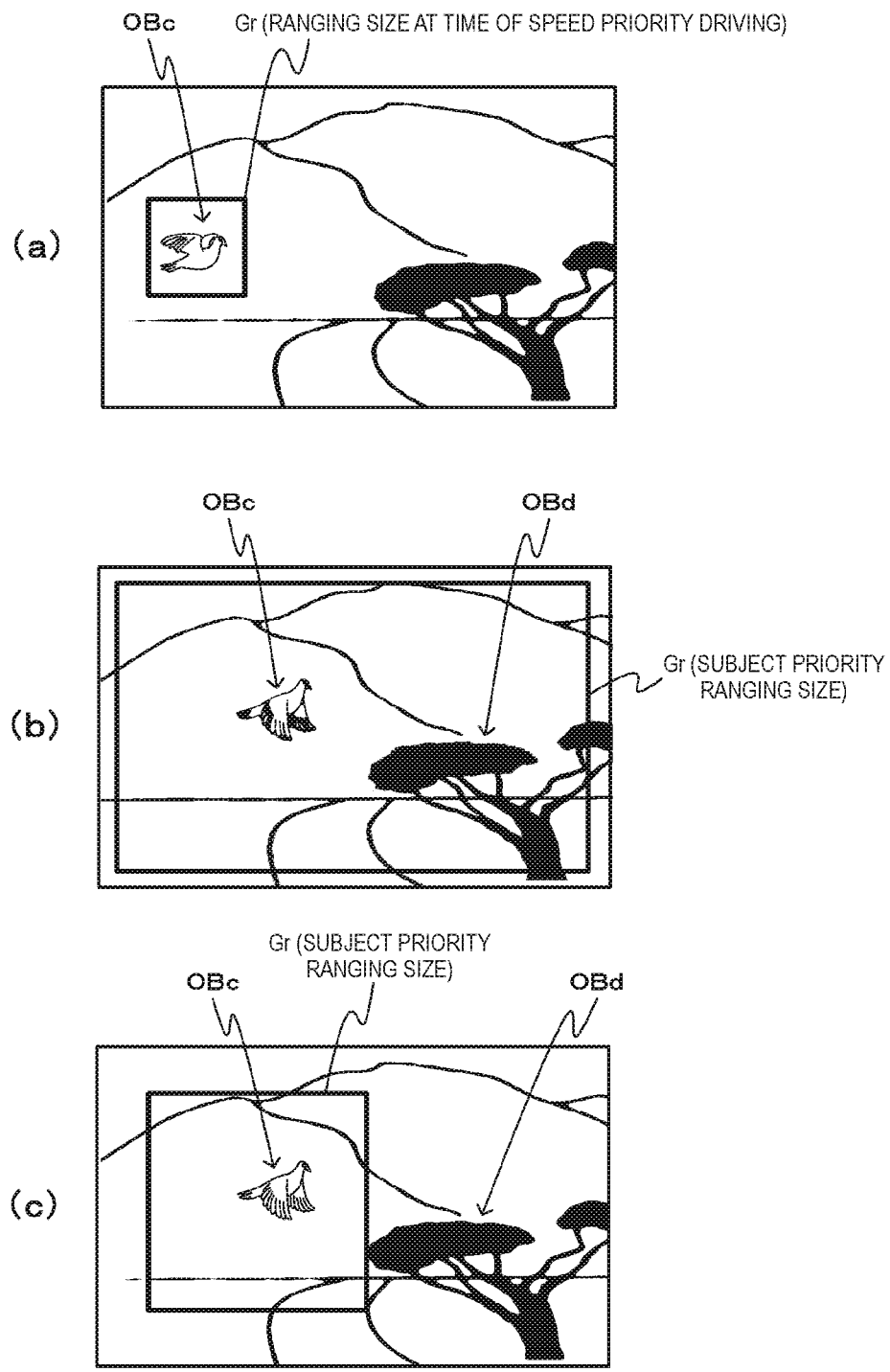
FIG. 16 is a diagram illustrating another operation example according to the second embodiment.

In addition, the focus driving control unit 34 may adjust the region size in accordance with the depth of field in a case in which the ranging area is set to the subject priority ranging size larger than the ranging size at the time of the speed priority driving. In a case in which the depth of field is deep, it is difficult to separate the desired subject from another subject in accordance with the defocus amount. Therefore, for example, when the subject priority ranging size is set to the entire imaging screen, focus is adjusted on the other subject different from the desired subject. Thus, there is concern of the focus driving control unit 34 not causing the focus to track the moving desired subject. FIG. 16 is a diagram illustrating another operation example according to the second embodiment. (a) of FIG. 16 exemplifies a state in which the ranging area is set as a ranging size at the time of the speed priority driving and a subject OBc is in focus. The depths of field of the subject OBc and a subject OBd are deep and it is thus difficult to separate the subject OBc from the subject OBd in accordance with the defocus amount.

Therefore, as illustrated in (b) of FIG. 16, when the subject priority ranging size is larger than the ranging size at the time of the speed priority driving and the subject OBc and the subject OBd are included in the ranging area, the subject OBd is in focus, and thus there is concern of the captured image becoming an image in which the subject OBc is blurred.

In addition, in a case in which the depth of field is shallow, it is possible to easily separate the desired subject from another subject in accordance with the defocus amount. Therefore, for example, even when the subject priority ranging size is the entire imaging screen, it is different to adjust the focus on another subject different from the desired subject and the focus driving control unit 34 cause the focus to easily track the moving desired subject.

Accordingly, the focus driving control unit 34 further decreases the subject priority ranging size in a case in which the depth of field is deep than in a case in which the depth of field is shallow. Specifically, the subject priority ranging size is further decreased in a case in which a focal distance is short or a case in which a diaphragm value is large than in a case in which the focal distance is large or a case in which the diaphragm value is small. In this way, by setting the subject priority ranging size in accordance with the depth of field, it is possible to reliably cause the focus to track a desired moving subject. For example, as illustrated in (c) of FIG. 16, in a case in which the subject priority ranging size is larger than the ranging size at the time of the speed priority driving and the depth of field is deep, a captured image in which the subject OBc is not blurred can be continuously generated by setting the subject priority ranging size to a size less than the entire imaging screen.

<4. Third Embodiment of Auto-Focus Control>

Incidentally, in the above-described second embodiment, the subject priority ranging size is set to be larger than the ranging size at the time of the speed priority driving so that the focus can track the moving subject. However, in a case in which there is a portion aimed to be pinpoint in a stationary subject or a subject, it is not necessary to set the subject priority ranging size to be larger than the ranging size at the time of the speed priority driving. In particular, focus control is preferably performed on the stationary subject with high precision so that blurring is small in the image. Accordingly, in a third embodiment, in a case in which a subject included in the ranging area is stationary or a case in which a position at which focus is desired to be adjusted in the subject included in the ranging area is pinpoint, the subject priority ranging size is set to the ranging size at the time of the speed priority driving or to be less than the ranging size at the time of the speed priority driving so that the focus control is performed with high precision.

The focus driving control unit 34 performs the process illustrated in FIG. 12. In a case in which the ranging area is set to the subject priority ranging size in step ST15, the subject priority ranging size is set to be larger than the ranging size at the time of the speed priority driving in the case of the subject being a moving subject and the subject priority ranging size is set to the ranging size at the time of the speed priority driving or to be less than the ranging size at the time of the speed priority driving in the case of the subject being a stationary subject. The determination of whether the subject is a stationary subject or a moving subject can be determination performed on the basis of the defocus amount, a matching process for a captured image, an imaging mode, or the like as in the first embodiment.

Figure 17:
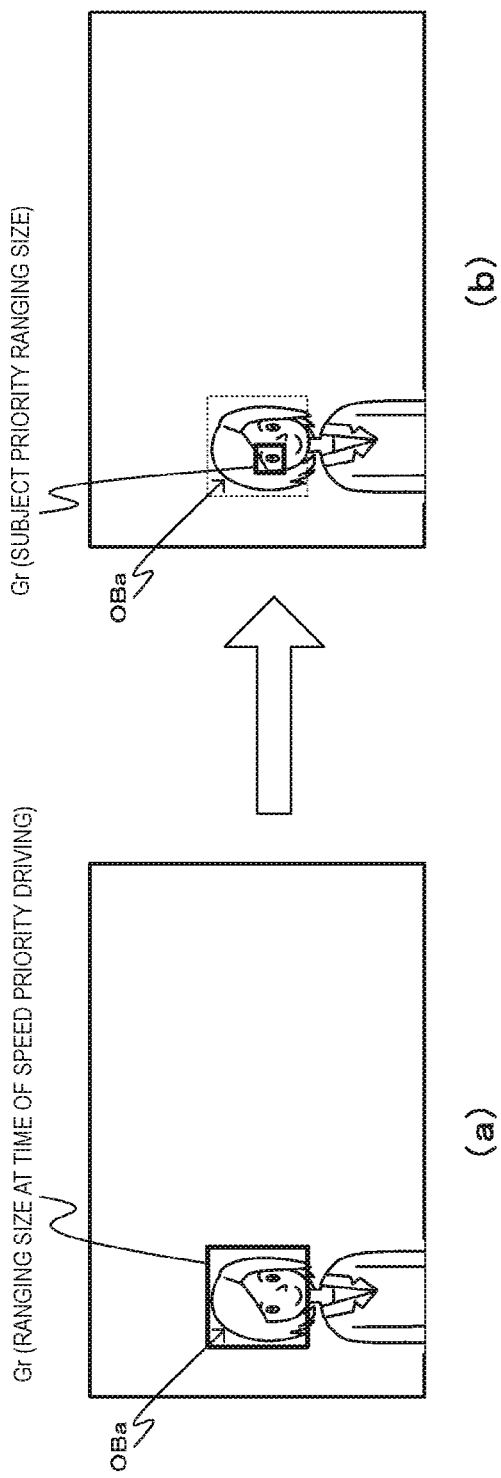
FIG. 17 is a diagram illustrating an operation example according to a third embodiment.

In a case in which the subject priority ranging size is set to be less than the ranging size at the time of the speed priority driving, the focus driving control unit 34 decreases a region using a subject being in focus as a standard or using a center of the ranging area which is the ranging size at the time of the speed priority driving as a standard. In addition, the focus driving control unit 34 may set feature points indicating features of the subject included in the ranging area which is the ranging size at the time of the speed priority driving so that the feature points are included in the ranging area of the subject priority ranging size. FIG. 17 illustrates an operation example according to the third embodiment. As illustrated in (a) of FIG. 17, the entire face of the subject (person) OB is assumed to be included in the ranging area of the ranging size at the time of the speed priority driving indicated by, for example, the ranging frame Gr. Here, in a case in which the subject is stationary and the subject priority ranging size is set to be less than the ranging size at the time of the speed priority driving, as illustrated in (b) of FIG. 17, the ranging frame Gr is set at feature points indicating features of the subject, for example, the positions of pupils.

In this way, in a case in which the defocus amount is equal to or less than the ranging area determination threshold, the focus control can be performed on the feature points of the subject when the ranging area is set to the subject priority ranging size less than the ranging size at the time of the speed priority driving. At this time, a variation in defocus is caused since a ranging score in the ranging area is small when the ranging area is set to be small. Therefore, as will be described below, in a case in which the driving control determination threshold and the ranging area determination threshold are set to an equal value and the focus driving control according to the first embodiment is combined and performed, the defocus amount is equal to or less than the ranging area determination threshold. When the ranging area is set to be less than the ranging size at the time of the speed priority driving, precision priority control may be performed in the subject priority driving control. In this way, the focus control can be performed with higher precision and stably. Accordingly, the imaging unit 20 can generate a captured image in which blurring further decreases in a desired subject.

<5. Other Embodiments of Auto-Focus Control>

The imaging system may realize the above-described embodiments in combination without being limited to a case in which the above-described embodiments are individually realized. For example, in a case in which the first and second embodiments are combined, the ranging area is set to the ranging size at the time of the speed priority driving and the speed priority driving control is performed when the defocus amount is large and the evaluation value is small. Accordingly, not only can the focus be adjusted on a desired subject but a captured image in which a focus change until focusing is a focus change desired by the user can also be generated by the imaging unit 20. In addition, when the defocus amount decreases or the evaluation value increases, the ranging area is set to the subject priority ranging size larger than the ranging size at the time of the speed priority driving and the subject priority driving control is performed. Accordingly, the imaging unit 20 can generate a captured image in which a state in which the desired subject is in focus is reliably maintained with high precision.

In addition, when the first and third embodiments are combined and the driving control determination threshold and the ranging area determination threshold are set to an equal value, as described above, the ranging area is set to the ranging size at the time of the speed priority driving and the speed priority driving control is performed at the time of a large defocus amount. Accordingly, not only can the focus be adjusted on a desired subject but a captured image in which a focus change until focusing is a focus change desired by the user can also be generated by the imaging unit 20. In addition, when the defocus amount decreases, the ranging area is set to the ranging size at the time of the speed priority driving or the subject priority ranging size less than the ranging size at the time of the speed priority driving and the subject priority driving control is performed. Accordingly, the imaging unit 20 can generate a captured image in which a state in which feature portions of the desired subject are in focus with high precision is maintained with high precision. Note that the driving control determination threshold and the ranging area determination threshold may be set to predetermined values in advance or may be considered to be able to be set or changed in accordance with a user manipulation, an imaging mode of the subject, a motion state of the subject, and the like. For example, even when a subject is moved in a depth direction after the desired subject is in focus, it is necessary to set the driving control determination threshold to be large to some extent in order to continue a focusing state. However, when there is a plurality of subjects in which the defocus amount is within the driving control determination threshold, it is difficult to separate a desired subject from the other subjects. Accordingly, the driving control determination threshold at the time of the subject being a stationary subject is set to be less than the driving control determination threshold at the time of the subject being a moving subject.

Further, when the defocus amount decreases in combination of the first to third embodiments, optimum focus control can be performed depending on whether a subject is a moving subject or a stationary subject.

In this way, when the first embodiment and the focus control is performed in combination of the second or third embodiment, it is possible to easily perform a stable auto-focus operation with the high degree of freedom and with high precision.

A series of processing described herein can be executed by hardware, software, or the combination thereof. In a case of executing the processing by the software, the processing can be executed by installing the program in which the processing sequence is recorded in the memory of the computer embedded in the dedicated hardware, or can be executed by installing the program in the general-purpose computer that can execute various processing.

For example, the program can be recorded on a hard disk, a solid state drive (SSD) or read only memory (ROM) as a recording medium in advance. Alternatively, the program can be temporarily or permanently stored (recorded) in (on) a removable recording medium such as a flexible disk, a compact disc read only memory (CD-ROM), Magneto Optical (MO) disk, a digital versatile disc (DVD), a Blu-Ray Disc (registered trademark) (BD), a magnetic disk, or a semiconductor memory card. Such a removable recording medium can be provided as so-called package software.

In addition, the program can be, not only installed on a computer from a removable recording medium, but also transferred wirelessly or by wire to the computer from a download site via a network such as a LAN (Local Area Network) or the Internet. In such a computer, a program transferred in the aforementioned manner can be received and installed on a recording medium such as built-in hardware.

Note that the effects described in the present specification are merely examples, not limitative; and additional effects that are not described may be exhibited. The present technology is not interpreted as being limited to the above-described embodiments of the technology. The embodiments of the technology disclose the present technology in the form of exemplification, and it is obvious that a person skilled in the art can make modification or substitution of the embodiments without departing from the gist of the present technology. In other words, in order to determine the gist of the present technology, the claims should be considered.

Additionally, the focus control device of the present technology may also be configured as below.

(1)

A focus control device including:

a focus driving control unit configured to perform speed priority driving control in which a focus lens is driven to a focusing position in a driving pattern set in advance in a case in which a defocus amount detected in a ranging area within an imaging screen is greater than a driving control determination threshold set in advance.

(2)

The focus control device according to (1), in which the driving pattern indicates a movement speed of the focus lens, and the focus driving control unit sets the movement speed of the focus lens in accordance with the driving pattern.

(3)

The focus control device according to (1) or (2), further including:

a driving pattern storage unit configured to store the driving pattern, in which the focus driving control unit generates a driving pattern in accordance with a user manipulation on the focus lens and stores the driving pattern in the driving pattern storage unit.

(4)

The focus control device according to any of (1) to (3), including:

a user interface unit configured to receive a user manipulation, in which the focus driving control unit performs setting or changing the driving pattern in accordance with the user manipulation.

(5)

The focus control device according to any of (1) to (4), in which the focus driving control unit performs the speed priority driving control in a case in which an evaluation value in accordance with sharpness of a subject image calculated by extracting a high frequency component from an image signal is greater than the driving control determination threshold.

(6)

A focus control device including:
a focus driving control unit configured to perform subject priority driving control in which a focus lens movement amount by which a focus lens is located at a focusing position in accordance with a defocus amount detected in a ranging area within an imaging screen is set and the focus lens is driven in a case in which the defocus amount is equal to or less than a driving control determination threshold set in advance.

(7)

The focus control device according to (6), in which, in the subject priority driving control, the focus driving control unit performs trackability priority control in which the focus lens movement amount is set so that the defocus amount is minimized, stability priority control in which the focus lens movement amount is set so that a smoothed defocus amount obtained by smoothing the defocus amount in a time direction or a spatial direction is minimized, or precision priority control in which an evaluation value indicating sharpness of an image is calculated from a captured image of a subject of the ranging area and the focus lens is driven so that the sharpness is maximized.

(8)

The focus control device according to (7), in which the focus driving control unit performs the trackability priority control, the stability priority control, or the precision priority control in accordance with a motion state of a subject of the ranging area.

(9)

The focus control device according to any of (6) to (8), including:
a user interface unit configured to receive a user manipulation,
in which the focus driving control unit performs setting or changing the ranging area in accordance with the user manipulation.

(10)

A focus control device including:
a focus driving control unit configured to perform driving control of a focus lens in accordance with a defocus amount detected in a ranging area within an imaging screen and setting a region size of the ranging area,
in which the focus driving control unit performs speed priority driving control in which the focus lens is driven to a focusing position in a driving pattern set in advance in a case in which the defocus amount is greater than a driving control determination threshold set in advance,
performs subject priority driving control in which a focus lens movement amount by which the focus lens is located at the focusing position in accordance with the defocus amount is set and the focus lens is driven in a case in which the defocus amount is equal to or less than the driving control determination threshold,
sets the ranging area to a ranging size at a time of speed priority driving which is a region size set in advance in a case in which the defocus amount is greater than a ranging area determination threshold set in advance, and
sets the ranging area to a subject priority ranging size which is a region size different from the ranging size at the time of the speed priority driving in a case in which the defocus amount is equal to or less than the ranging area determination threshold.

(11)

The focus control device according to (10), in which the focus driving control unit sets the subject priority ranging size in accordance with a motion state of a subject of the ranging area.

(12)

The focus control device according to (11), in which the focus driving control unit makes the subject priority ranging size larger than the ranging size at the time of the speed priority driving in a case in which the subject is a moving subject.

(13)

The focus control device according to (11) or (12), in which the focus driving control unit makes the subject priority ranging size to be the ranging size at the time of the speed priority driving or smaller than the ranging size at the time of the speed priority driving in a case in which the subject is a stationary subject.

(14)

The focus control device according to (10), in which the focus driving control unit sets the subject priority ranging size in accordance with an imaging mode of a subject.

(15)

The focus control device according to (14), in which the focus driving control unit makes the subject priority ranging size larger than the speed priority ranging size in a case in which the imaging mode is a mode in which a moving subject is imaged.

(16)

The focus control device according to (14) or (15), in which the focus driving control unit makes the subject priority ranging size to be the ranging size at the time of the speed priority driving or smaller than the ranging size at the time of the speed priority driving in a case in which the imaging mode is a mode in which a stationary subject is imaged.

(17)

The focus control device according to any of (10) to (16), in which the focus driving control unit sets the subject priority ranging size in accordance with a depth of field and makes a region size smaller in a case in which the depth of field is deep than in a case in which the depth of field is shallow.

INDUSTRIAL APPLICABILITY

According to the focus control device, the focus control method, the program, and the imaging device according to the present technology, it is possible to perform the speed priority driving control in which the focus lens is driven to the focusing position in the driving pattern set in advance in a case in which a defocus amount detected in a ranging area within an imaging screen is greater than the driving control determination threshold set in advance. Therefore, it is possible to easily perform the auto-focus operation with the high degree of freedom. Accordingly, the focus control device, the focus control method, the program, and the imaging device are appropriate for a video camera or a digital camera that has a function of capturing a moving image.

REFERENCE SIGNS LIST

10 imaging system
20 imaging unit 21 imaging optical system block
22 imaging optical system driving and processing unit
23 image sensor
24 signal processing unit
25 ranging unit
30 control unit
31 image signal output control unit
32 defocus detection unit
33 driving pattern storage unit
34 focus driving control unit
40 user interface (I/F) unit
50 display unit
60 recording reproduction unit
211 focus lens
212 zoom lens
213 diaphragm
214 shutter mechanism
401 movement key
402 selection key
403 ranging area reading switch

The invention claimed is:

1. A focus control device comprising:
a focus driving control circuitry configured to perform driving control of a focus lens in accordance with a defocus amount detected in a ranging area within an imaging screen and setting a region size of the ranging area,
wherein the focus driving control circuitry is configured to perform speed priority driving control in which the focus lens is driven to a focusing position in a driving pattern that is set in advance in a case in which the defocus amount is greater than a driving control determination threshold that is set in advance and in a case in which an evaluation value in accordance with sharpness of a subject image calculated by extracting a high frequency component from an image signal is less than a second driving control determination threshold,
perform subject priority driving control in which a focus lens movement amount by which the focus lens is located at the focusing position in accordance with the defocus amount is set and the focus lens is driven in a case in which the defocus amount is equal to or less than the driving control determination threshold and in a case in which the evaluation value in accordance with the sharpness of the subject image calculated by extracting the high frequency component from the image signal is equal to or greater than the second driving control determination threshold,
set the ranging area to a speed priority ranging size at a time of speed priority driving which is a first region size that is set in advance in a case in which the defocus amount is greater than a ranging area determination threshold that is set in advance, and
set the ranging area to a subject priority ranging size which is a second region size different from the first region size at a time of the speed priority driving in a case in which the defocus amount is equal to or less than the ranging area determination threshold.

2. The focus control device according to claim 1, wherein the focus driving control circuitry is configured to set the subject priority ranging size in accordance with a motion state of a subject of the ranging area.

3. The focus control device according to claim 2, wherein the focus driving control circuitry is configured to make the subject priority ranging size larger than the speed priority ranging size in a case in which the subject is a moving subject.

4. The focus control device according to claim 2, wherein the focus driving control circuitry is configured to make the subject priority ranging size to be the speed priority ranging size or smaller than the speed priority ranging size in a case in which the subject is a stationary subject.

5. The focus control device according to claim 1, wherein the focus driving control circuitry is configured to set the subject priority ranging size in accordance with an imaging mode of a subject.

6. The focus control device according to claim 5, wherein the focus driving control circuitry is configured to make the subject priority ranging size larger than the speed priority ranging size in a case in which the imaging mode is a mode in which a moving subject is imaged.

7. The focus control device according to claim 5, wherein the focus driving control circuitry is configured to make the subject priority ranging size to be the speed priority ranging size or smaller than the speed priority ranging size in a case in which the imaging mode is a mode in which a stationary subject is imaged.

8. The focus control device according to claim 1, wherein the focus driving control circuitry is configured to set the subject priority ranging size in accordance with a depth of field and makes the region size smaller in a case in which the depth of field is deep than in a case in which the depth of field is shallow.

* * * * *